US012155123B2

(12) United States Patent
Gouchi

(10) Patent No.: US 12,155,123 B2
(45) Date of Patent: Nov. 26, 2024

(54) ANTENNA DEVICE

(71) Applicant: Murata Manufacturing Co., Ltd., Nagaokakyo (JP)

(72) Inventor: Naoki Gouchi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 189 days.

(21) Appl. No.: 17/875,421

(22) Filed: Jul. 28, 2022

(65) Prior Publication Data

US 2022/0368029 A1 Nov. 17, 2022

Related U.S. Application Data

(63) Continuation of application No. PCT/JP2020/046241, filed on Dec. 11, 2020.

(30) Foreign Application Priority Data

Jan. 30, 2020 (JP) ................................ 2020-013710

(51) Int. Cl.
*H01Q 21/06* (2006.01)
*H01Q 9/04* (2006.01)
(Continued)

(52) U.S. Cl.
CPC ......... *H01Q 21/065* (2013.01); *H01Q 9/0407* (2013.01); *H01Q 21/08* (2013.01); *H01Q 21/20* (2013.01)

(58) Field of Classification Search
CPC .... H01Q 21/065; H01Q 9/0407; H01Q 21/08; H01Q 21/20; H01Q 1/38; H05K 1/0353; H05K 2201/0187
See application file for complete search history.

(56) References Cited

U.S. PATENT DOCUMENTS 4,783,661 A * 11/1988 Smith ...................... H01Q 5/42 343/700 MS
4,907,006 A * 3/1990 Nishikawa ............. H01Q 5/378 343/828
(Continued)

FOREIGN PATENT DOCUMENTS

CN 201518352 U * 6/2010 ............... H01Q 1/38
CN 109565108 A * 4/2019 ............... H01Q 1/52
(Continued)

OTHER PUBLICATIONS

International Search Report and Written Opinion mailed on Mar. 2, 2021, received for PCT Application PCT/JP2020/046241, filed on Dec. 11, 2020, 11 pages including English Translation.

*Primary Examiner* — Dimary S Lopez Cruz
*Assistant Examiner* — Jordan E. DeWitt
(74) *Attorney, Agent, or Firm* — XSENSUS LLP

(57) ABSTRACT

An antenna device includes a plate-shaped radiating element that radiates a radio wave polarized in an X-axis direction, a grounding electrode (GND), and a dielectric substrate that carries the radiating element and the grounding electrode (GND). In the dielectric substrate, dielectric in designated regions, which are included in adjustment regions that are located on the outer side with respect to first boundary planes and on the outer side with respect to second boundary planes, is thinner than dielectric in a non-adjustment region. The first boundary planes are planes extending on end faces of the radiating element on the respective sides in an X-axis direction (polarization direction) and being orthogonal to the X-axis direction. The second boundary planes are planes extending on end faces of the radiating element on the respective sides in a Y-axis direction and being orthogonal to the first boundary planes and to the Y-axis direction.

20 Claims, 21 Drawing Sheets

(51) Int. Cl.
*H01Q 21/08* (2006.01)
*H01Q 21/20* (2006.01)

(56) References Cited

U.S. PATENT DOCUMENTS 5,703,601 A * 12/1997 Nalbandian .......... H01Q 9/0414 343/846
6,075,485 A * 6/2000 Lilly .................... H01Q 9/0407 343/895
6,211,824 B1 * 4/2001 Holden ................ H01Q 9/0414 343/846
6,281,845 B1 * 8/2001 Ittipiboon ............ H01Q 9/0435 343/846
7,109,948 B2 * 9/2006 Oyama .................. H01Q 1/241 343/904
7,460,072 B1 * 12/2008 Goldberger .............. H01Q 1/38 343/700 MS
9,035,843 B1 * 5/2015 Mitu ...................... H01Q 21/08 343/700 MS
9,647,325 B2 * 5/2017 Geary .................. H01Q 21/065
10,468,763 B2 * 11/2019 Yokoyama ............. H01Q 23/00
10,727,565 B2 * 7/2020 Kim ......................... H01Q 1/38
11,322,830 B2 * 5/2022 Echikawa ................ H01Q 1/38
2002/0041255 A1 * 4/2002 Baba .................... H01Q 9/0442 343/846
2002/0063269 A1 * 5/2002 DiBene, II .............. H01P 1/184 257/700
2004/0212536 A1 * 10/2004 Mori ...................... H01Q 1/243 343/700 MS
2005/0264452 A1 * 12/2005 Fujishima ............ H01Q 9/0407 343/700 MS
2006/0017616 A1 * 1/2006 Hsu ...................... H01Q 9/0407 343/700 MS
2006/0227051 A1 * 10/2006 Yamamoto ............... H01Q 1/38 343/846
2007/0132642 A1 * 6/2007 Iluz ...................... H01Q 21/065 343/700 MS
2008/0122697 A1 * 5/2008 Mierke ................ H01Q 9/0414 343/700 MS
2009/0256737 A1 * 10/2009 Ohlsson ............... H01Q 21/065 342/124
2011/0163921 A1 * 7/2011 Chirila ................... H01Q 1/526 343/702
2012/0044113 A1 * 2/2012 Satoh ................... H01Q 9/0407 343/893
2013/0021207 A1 * 1/2013 Lee .......................... H01Q 1/38 29/401.1
2013/0044035 A1 * 2/2013 Zhuang ................ H01Q 9/0428 343/770
2014/0035792 A1 * 2/2014 Schadler ............ H01Q 21/0087 343/798
2014/0152509 A1 * 6/2014 Liu ......................... H01L 24/19 427/58
2017/0346179 A1 * 11/2017 Wu ........................ H01Q 1/523
2018/0062266 A1 * 3/2018 Haziza ................. H01Q 21/245
2018/0198198 A1 * 7/2018 Nishimoto ........... H01Q 19/021
2018/0331041 A1 * 11/2018 Liao ..................... H01Q 1/2283
2019/0089057 A1 * 3/2019 Mitchell .................. H01Q 5/42
2019/0103660 A1 * 4/2019 Zimmerman .......... H01Q 19/06
2019/0221937 A1 * 7/2019 Onaka .................... H01Q 5/385
2019/0302271 A1 * 10/2019 Panther .................. H01Q 5/385
2019/0363432 A1 * 11/2019 Hayashi .................. B32B 3/266
2019/0379134 A1 * 12/2019 Paulotto ............... H01Q 21/062
2020/0021015 A1 * 1/2020 Yun ...................... H01Q 1/2283
2020/0212569 A1 * 7/2020 Kumar ................. H01Q 21/065
2020/0295436 A1 * 9/2020 Ueda .................... H01Q 21/065
2020/0295437 A1 * 9/2020 Ueda .................... H01Q 9/0407
2020/0328530 A1 * 10/2020 Park ..................... H01Q 1/2283
2021/0075115 A1 * 3/2021 Kim ....................... H01Q 1/243
2022/0368029 A1 * 11/2022 Gouchi .................. H01Q 21/20
2022/0368031 A1 * 11/2022 Gouchi ................ H01Q 1/2283
2023/0112892 A1 * 4/2023 Choi .................. H01Q 21/0006 343/702
2023/0327338 A1 * 10/2023 Minamitani ........... H01Q 21/28 343/727
2024/0047883 A1 * 2/2024 Minamitani ......... H01Q 1/2283

FOREIGN PATENT DOCUMENTS

CN 114698226 A * 7/2022 ............. H01Q 1/243
CN 114725698 A * 7/2022
CN 114883799 B * 10/2022
EP 1239542 A1 * 9/2009 ........... H01Q 9/0407
JP 1-245601 A 9/1989
JP 2-298105 A 12/1990
JP 3-68201 A 3/1991
JP 6-112730 A 4/1994
JP 2005130333 A * 5/2005
JP 2006-80609 A 3/2006
JP 2006080609 A * 3/2006
JP 2007-67596 A 3/2007
JP 2007067596 A * 3/2007
JP 4383411 B2 12/2009
JP 2019-216361 A 12/2019
TW 201220749 A * 5/2012 ............. H01Q 1/241
TW 201305661 A * 2/2013 ........... H01L 31/048
WO WO-2006011459 A1 * 2/2006 ........... H01Q 9/0471
WO 2016/067969 A1 5/2016
WO WO-2020066453 A1 * 4/2020 ............. H01Q 13/08
WO WO-2020066604 A1 * 4/2020 ........... H01Q 1/2283
WO WO-2020231763 A1 * 11/2020 ............. H01Q 1/007
WO WO-2021153035 A1 * 8/2021 ............... H01Q 1/38

* cited by examiner

PRESENT DISCLOSURE

CHARACTERISTICS OF HARMONIC WAVE

CHARACTERISTICS OF HARMONIC WAVE

| CONDITIONS | F0 (GHz) | PEAK GAIN (dB) | -3-dB ANGLE (deg) |
|---|---|---|---|
| COMPARATIVE EXAMPLE (CORRESPONDING TO KNOWN ARTS) | 52 | 5.50 | 53.8 |
| PRESENT DISCLOSURE | | 5.89 | 53.5 |
| COMPARATIVE EXAMPLE (CORRESPONDING TO KNOWN ARTS) | 66 | 2.80 | 150.6 |
| PRESENT DISCLOSURE | | 2.78 | 142.8 |

ANGLE OF RADIATION OF HARMONIC WAVE CAN BE NARROWED

COMPARATIVE EXAMPLE 1

COMPARATIVE EXAMPLE 2

REFLECTION CHARACTERISTIC OF FUNDAMENTAL WAVE

FIG.14

CHARACTERISTICS OF FUNDAMENTAL WAVE

NO CHANGE IN f0

NO CHANGE

| CONDITIONS | f0 (GHz) | PEAK GAIN (dB) | PEAK ANGLE (deg) | -3-dB ANGLE (deg) |
|---|---|---|---|---|
| COMPARATIVE EXAMPLE (CORRESPONDING TO KNOWN ARTS) | 28.0 | 6.54 | 0 | 91.9 |
| PRESENT DISCLOSURE | 28.0 | 6.58 | 0 | 91.8 |
| COMPARATIVE EXAMPLE 1 | 28.3 | 6.60 | 0 | 88.2 |
| COMPARATIVE EXAMPLE 2 | 29.4 | 6.77 | 0 | 89.7 |

SOME CHANGE IN f0

NARROW

FIG.15

CHARACTERISTICS OF FUNDAMENTAL WAVE
(AT THE SAME f0)

f0 MADE THE SAME

NO CHANGE

| CONDITIONS | f0 (GHz) | PEAK GAIN (dB) | PEAK ANGLE (deg) | -3-dB ANGLE (deg) |
|---|---|---|---|---|
| COMPARATIVE EXAMPLE (CORRESPONDING TO KNOWN ARTS) | 28.0 | 6.54 | 0 | 91.9 |
| PRESENT DISCLOSURE | 28.0 | 6.58 | 0 | 91.8 |
| COMPARATIVE EXAMPLE 1 | 28.0 | 6.57 | 0 | 88.7 |
| COMPARATIVE EXAMPLE 2 | 28.0 | 6.68 | 0 | 91.1 |

NARROWED

PRESENT DISCLOSURE

ANTENNA DEVICE

CROSS-REFERENCE TO RELATED APPLICATIONS

The present application is a continuation of PCT/JP2020/046241, filed Dec. 11, 2020, which claims priority to Japanese patent application JP 2020-013710, filed Jan. 30, 2020, the entire contents of each of which being incorporated herein by reference.

TECHNICAL FIELD

The present disclosure relates to an antenna device including a radiating element, a grounding electrode, and a dielectric substrate carrying the radiating element and the grounding electrode.

BACKGROUND ART

In International Publication No. 2016/067969 (Patent Document 1) is disclosed an antenna including a plurality of plate-shaped radiating elements, a grounding electrode, and a dielectric substrate carrying the plurality of radiating elements and the grounding electrode. In this antenna, the plurality of radiating elements are arranged at predetermined intervals on the dielectric substrate.

CITATION LIST

Patent Document

Patent Document 1: International Publication No. 2016/067969

SUMMARY

Technical Problems

In general, a radio wave radiated from an antenna contains a fundamental wave having a fundamental frequency, which is to be the target output frequency; and a harmonic wave having a frequency that is close to an integer multiple of the fundamental frequency. There are needs, as recognized by the present inventor, for an antenna configured to radiate a radio wave while maintaining the characteristics of the fundamental wave but reducing the influence of the harmonic wave upon peripheries as much as possible. However, International Publication No. 2016/067969 involves no configuration that meets such needs.

The present disclosure is to solve the above problem, as well as other problems, and according one, non-limiting object of the present disclosure is to adjust the characteristics of the harmonic wave to be radiated from an antenna while the characteristics of the fundamental wave are maintained.

Solutions to Problems

An antenna device according to the present disclosure includes a plate-shaped first radiating element that, in response to being exited with a transmission signal, radiates a radio wave polarized in a first direction, and a dielectric substrate that carries the first radiating element. Defining planes extending on end faces of the first radiating element on respective sides in the first direction and being orthogonal to the first direction be first boundary planes; and planes extending on end faces of the first radiating element on respective sides in a second direction, which is orthogonal to the first direction, and being orthogonal to the second direction be second boundary planes, the dielectric substrate has adjustment regions around the first radiating element on an outer side with respect to the first boundary planes and on an outer side with respect to the second boundary planes. The adjustment regions include a designated region where an effective dielectric constant is different from an effective dielectric constant in a non-adjustment region that is a region other than the adjustment regions.

Another antenna device according to the present disclosure includes a plate-shaped first radiating element that, in response to being exited with a transmission signal, radiates a radio wave polarized in a first direction, and a dielectric substrate that carries the first radiating element. Defining planes extending on end faces of the first radiating element on respective sides in the first direction and being orthogonal to the first direction be first boundary planes; and planes extending on end faces of the first radiating element on respective sides in a second direction, which is orthogonal to the first direction, and being orthogonal to the second direction be second boundary planes, the dielectric substrate has adjustment regions around the first radiating element on an outer side with respect to the first boundary planes and on an outer side with respect to the second boundary planes. The adjustment regions include a designated region that is thinner than dielectric material in a non-adjustment region that is a region other than the adjustment regions.

Yet another antenna device according to the present disclosure includes a plate-shaped radiating element, and a dielectric substrate that carries the radiating element. The radiating element has a feeding point at a position that is offset from a center of a plane of the radiating element. Letting a direction of a virtual line connecting the center of the plane of the radiating element and the feeding point be a first direction; planes extending on end faces of the radiating element on respective sides in the first direction and being orthogonal to the first direction be first boundary planes; and planes extending on end faces of the radiating element on respective sides in a second direction, which is orthogonal to the first direction, and being orthogonal to the second direction be second boundary planes, the dielectric substrate has adjustment regions around the radiating element on an outer side with respect to the first boundary planes and on an outer side with respect to the second boundary planes. The adjustment regions include a designated region where an effective dielectric constant is different from an effective dielectric constant in a non-adjustment region that is a region other than the adjustment regions.

Advantageous Effects of Disclosure

According to the present disclosure, the characteristics of the harmonic wave to be radiated from the antenna device are adjusted while the characteristics of the fundamental wave are maintained. As used herein, the term "harmonic wave" is generally understood to mean a waveform that has a dominant local component at or close to an integer multiple of the fundamental, and need not be a single frequency but may have some limited spectral width around the harmonic component.

BRIEF DESCRIPTION OF DRAWINGS

FIG. 14 is a table (No. 1) summarizing the peak gain, the peak angle, and the −3-dB angle of the fundamental wave.

FIG. 15 is a table (No. 2) summarizing the peak gain, the peak angle, and the −3-dB angle of the fundamental wave.

DESCRIPTION OF EMBODIMENTS

Figure 1:
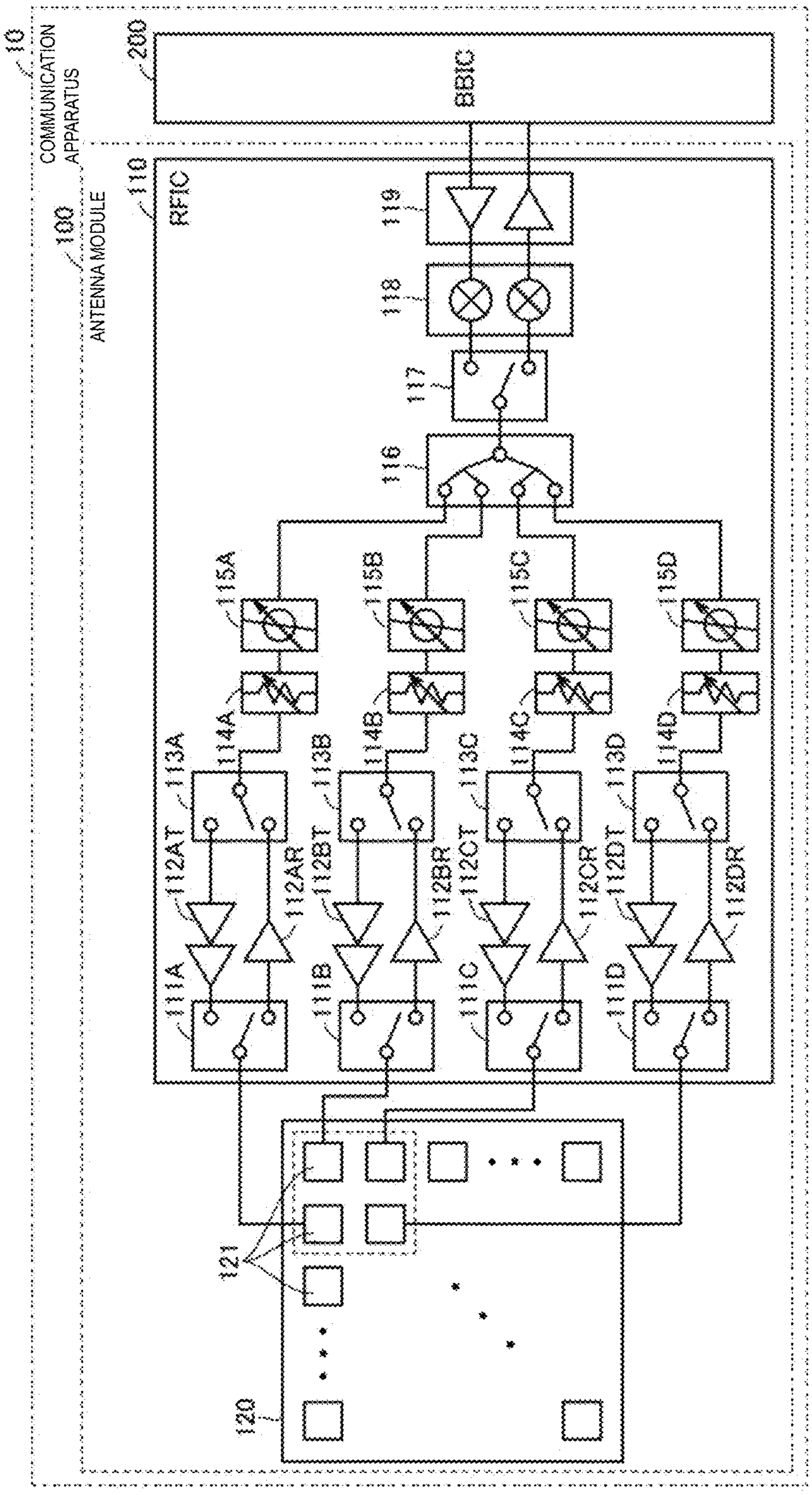
FIG. 1 is an exemplary block diagram of a communication apparatus to which an antenna device is applied.

An embodiment of the present disclosure will now be described in detail with reference to the drawings. The same or corresponding elements are denoted by the same reference signs, respectively, in the drawings, and redundant description of such elements is omitted.

(Basic Configuration of Communication Apparatus)

FIG. 1 is an exemplary block diagram of a communication apparatus 10, to which an antenna device 120 according to the present embodiment is applied. The communication apparatus 10 is, for example, a mobile terminal such as a mobile phone, a smartphone, or a tablet; or a personal computer including a communication function. An antenna module 100 according to the present embodiment operates with radio waves at frequencies in, for example, a millimeter-order waveband with a center frequency of, for example, 28 GHz, 39 GHz, or 60 GHz. The antenna module 100 may also be applied to radio waves of any frequency bands other than the above.

Referring to FIG. 1, the communication apparatus 10 includes the antenna module 100 and a BBIC (base band integrated circuit) 200. The BBIC 200 serves as a baseband-signal-processing circuit. The antenna module 100 includes an RFIC (radio frequency integrated circuit) 110 and the antenna device 120. The RFIC 110 is an exemplary power-feeding component. In the communication apparatus 10, a signal transmitted from the BBIC 200 to the antenna module 100 is upconverted into a radio-frequency signal to be radiated from the antenna device 120, meanwhile a radio-frequency signal received by the antenna device 120 is down-converted to be processed by the BBIC 200.

The antenna device 120 includes a plurality of radiating elements 121. For simplicity, FIG. 1 illustrates only a part relevant to four radiating elements of the plurality of radiating elements 121 and does not illustrate the other part relevant to the other radiating elements 121, which have the same configuration as the four radiating elements 121. While FIG. 1 illustrates a case where the antenna device 120 includes a plurality of radiating elements 121 arranged in a two-dimensional array, the antenna device 120 does not necessarily need to include a plurality of radiating elements 121 and may include a single radiating element 121. As another alternative, a plurality of radiating elements 121 may be arranged in a single line to form a one-dimensional array. Each radiating element 121 according to the present embodiment is formed as a patch antenna having a substantially square flat shape.

The RFIC 110 includes switches 111A to 111D, 113A to 113D, and 117; power amplifiers 112AT to 112DT; low-noise amplifiers 112AR to 112DR; attenuators 114A to 114D; phase shifters 115A to 115D; a multiplexer/demultiplexer 116; a mixer 118; and an amplifier circuit 119.

To output radio-frequency signals, the switches 111A to 111D and 113A to 113D are connected to the power amplifiers 112AT to 112DT, and the switch 117 is connected to a transmitter amplifier of the amplifier circuit 119. To receive radio-frequency signals, the switches 111A to 111D and 113A to 113D are connected to the low-noise amplifiers 112AR to 112DR, and the switch 117 is connected to a receiver amplifier of the amplifier circuit 119.

A signal transmitted from the BBIC 200 is amplified by the amplifier circuit 119 and is upconverted by the mixer 118. The radio-frequency signal obtained through the up-conversion, that is, a transmission signal, is demultiplexed by the multiplexer/demultiplexer 116 into four signals, which travel through four respective signal paths and are fed to the respective radiating elements 121. In this process, the degree of phase shift is individually adjusted by the phase shifters 115A to 115D, which are provided on the respective signal paths. Thus, the directivity of the antenna device 120 is adjusted.

Radio-frequency signals received by the respective radiating elements 121, that is, receive signals, travel through four respective signal paths and are multiplexed by the multiplexer/demultiplexer 116. The multiplexed receive signal is down-converted by the mixer 118, is amplified by the amplifier circuit 119, and is transmitted to the BBIC 200.

The RFIC 110 is provided in the form of, for example, a single chip serving as an integrated-circuit component including the above circuit configuration. Alternatively, the elements (switches, power amplifiers, low-noise amplifiers, attenuators, and phase shifters) of the RFIC 110 that are provided in correspondence with the radiating elements 121 may be grouped in correspondence with the radiating elements 121 into chips each serving as an integrated-circuit component.

(Configuration of Antenna Device)

Figure 2:
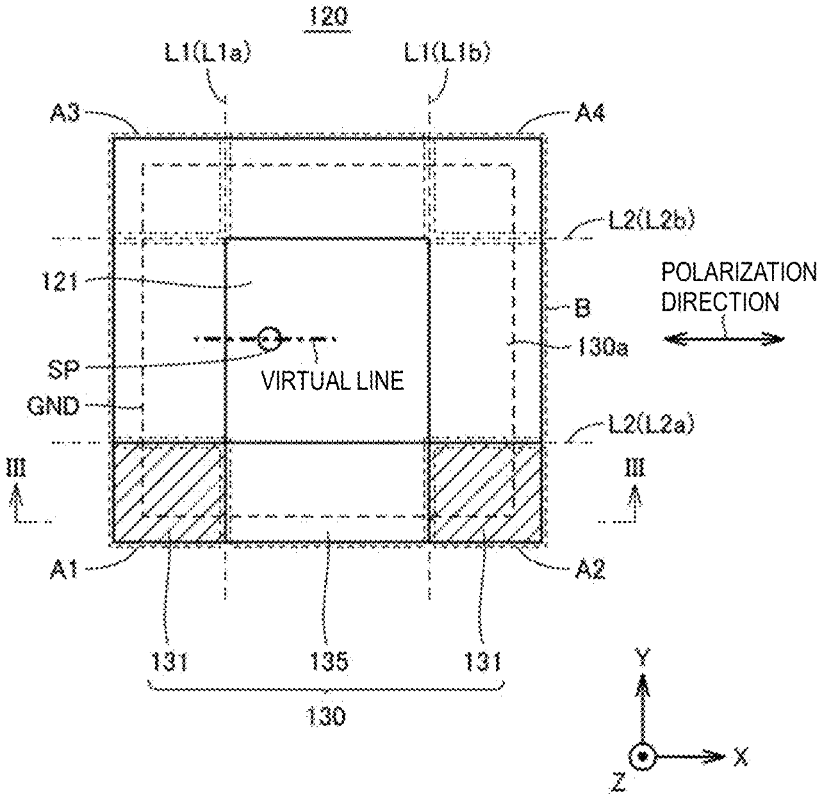
FIG. 2 is a plan view (No. 1) of the antenna device.
Figure 3:
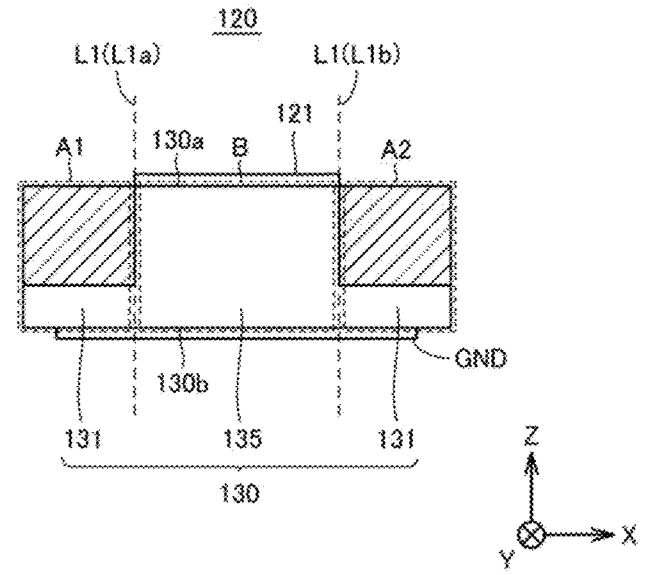
FIG. 3 is a sectional view (No. 1) of the antenna device.
Figure 4:
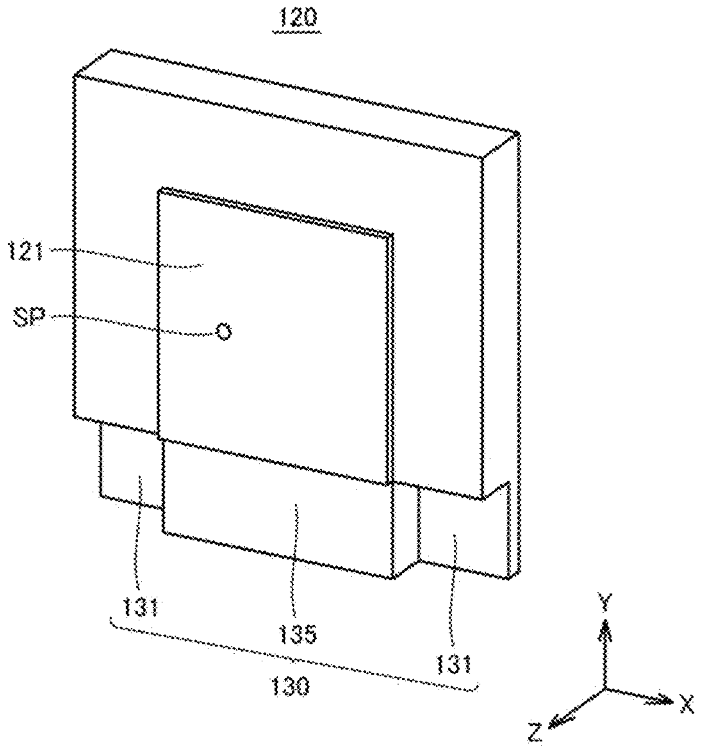
FIG. 4 is a perspective view (No. 1) of the antenna device.

FIG. 2 is a plan view of the antenna device 120. FIG. 3 is a sectional view of the antenna device 120, taken along line III-III illustrated in FIG. 2. FIG. 4 is a perspective view of the antenna device 120.

Referring to FIGS. 2 to 4, a configuration of the antenna device 120 according to the present embodiment will now be described in detail. The following description relates to a case where the antenna device 120 includes a single radiating element 121.

The antenna device 120 includes a radiating element 121, a grounding electrode GND, and a dielectric substrate 130, which carries the radiating element 121 and the grounding electrode GND.

The dielectric substrate 130 has a first major surface 130*a*, on which the radiating element 121 is provided; and a second major surface 130*b*, on which the grounding electrode GND is provided. The radiating element 121 and the grounding electrode GND do not necessarily need to be provided on surfaces of the dielectric substrate 130 and may be provided inside the dielectric substrate 130, in respective layers and at a predetermined interval from each other. As another alternative, the grounding electrode GND may be carried by another substrate that is separate from the dielectric substrate 130, with the substrate carrying the grounding electrode GND being connected to the dielectric substrate 130 by soldering or bonding.

Hereinafter, the thickness direction of the dielectric substrate 130 (the normal direction with respect to the first major surface 130*a*) is also referred to as "Z-axis direction", and directions that are perpendicular to the Z-axis direction and are perpendicular to each other are also referred to as "X-axis direction" and "Y-axis direction", respectively.

The dielectric substrate 130 is, for example, a multilayer substrate of low-temperature co-fired ceramic (LTCC), a multilayer resin substrate obtained by laminating a plurality of layers of resin such as epoxy and/or polyimide, a multilayer resin substrate obtained by laminating a plurality of layers of liquid-crystal polymer (LCP) having a lower dielectric constant, a multilayer resin substrate obtained by laminating a plurality of layers of fluorine-based resin, or a multilayer substrate made from ceramic other than LTCC. The dielectric substrate 130 does not necessarily need to have a multilayer structure and may be a single-layer substrate.

The radiating element 121, seen in the Z-axis direction, has a rectangular shape defined by two sides parallel to the X-axis direction and two sides orthogonal to the X-axis direction. The radiating element 121 has a feeding point SP, where the radiating element 121 is connected to the RFIC 110. The feeding point SP is offset from the center of the plane of the radiating element 121 toward the negative side in the X-axis direction. Accordingly, the X-axis direction is also regarded as the direction of a virtual line (the one-dot chain line illustrated in FIG. 2) connecting the center of the plane of the radiating element 121 and the feeding point SP. When a radio-frequency signal is supplied from the RFIC 110 to the feeding point SP of the radiating element 121, the radiating element 121 radiates toward the positive side in the Z-axis direction a radio wave that is polarized in the X-axis direction.

The grounding electrode GND is provided on the second major surface 130*b* of the dielectric substrate 130 and extends flat. The grounding electrode GND, seen in the Z-axis direction, has a size (area) greater than the size (area) of the radiating element 121.

In general, as described above, there are needs for an antenna configured to radiate a radio wave while maintaining the characteristics of the fundamental wave but reducing the influence of the harmonic wave upon peripheries as much as possible. The antenna device 120 according to the present embodiment includes features that meet such needs, as to be described below.

Hereinafter, planes extending on end faces of the radiating element 121 on the respective sides in the X-axis direction (polarization direction) and being orthogonal to the X-axis direction are defined as "first boundary planes L1". Furthermore, planes extending on end faces of the radiating element 121 on the respective sides in the Y-axis direction (a direction orthogonal to the polarization direction) and being orthogonal to the first boundary planes L1 and to the Y-axis direction are defined as "second boundary planes L2". As illustrated in FIG. 2, the first boundary planes L1 are a first boundary plane Lia and a first boundary plane Lib. The first boundary plane Lia extends on the end face of the radiating element 121 on the negative side in the X-axis direction. The first boundary plane Lib extends on the end face of the radiating element 121 on the positive side in the X-axis direction. As illustrated in FIG. 2, the second boundary planes L2 are a second boundary plane L2*a* and a second boundary plane L2*b*. The second boundary plane L2*a* extends on the end face of the radiating element 121 on the negative side in the Y-axis direction. The second boundary plane L2*b* extends on the end face of the radiating element 121 on the positive side in the Y-axis direction.

Hereinafter, regions of the dielectric substrate 130 around the radiating element 121 that are located on the outer side with respect to the first boundary planes L1 and on the outer side with respect to the second boundary planes L2 are defined as "adjustment regions A", and a region other than the adjustment regions A is defined as "non-adjustment region B". As illustrated in FIG. 2, the adjustment regions A include "adjustment region A1", which is on the outer side with respect to the first boundary plane Lia and on the outer side with respect to the second boundary plane L2*a*; "adjustment region A2", which is on the outer side with respect to the first boundary plane Lib and on the outer side with respect to the second boundary plane L2*a*; "adjustment region A3", which is on the outer side with respect to the first boundary plane Lia and on the outer side with respect to the second boundary plane L2*b*; and "adjustment region A4", which is on the outer side with respect to the first boundary plane Lib and on the outer side with respect to the second boundary plane L2*b*.

When a radio wave is radiated from the radiating element 121 in which the X-axis direction corresponds to the polarization direction, a magnetic field is generated in a region on the inner side with respect to the first boundary planes L1 (a region between the first boundary plane L1*a* and the first boundary plane L1*b*), and an electric field is generated in a region on the inner side with respect to the second boundary planes L2 (a region between the second boundary plane L2*a* and the second boundary plane L2*b*), basically. Therefore, the above adjustment regions A1 to A4 are considered to be less influenced by the electric field and the magnetic field that are generated when a radio wave is radiated from the radiating element 121.

In the dielectric substrate 130 according to the present embodiment, dielectric material in the adjustment regions A1 and A2 among the four adjustment regions A1 to A4 is trimmed to be thinner than dielectric in the non-adjustment region B. Specifically, in the adjustment regions A1 and A2, portions (the hatched parts) of the dielectric are trimmed off.

Hereinafter, among the four adjustment regions A1 to A4, the adjustment regions A1 and A2 where portions of the dielectric are trimmed off are also referred to as "designated regions A1 and A2" so as to be distinguished from the other adjustment regions A3 and A4. Furthermore, portions of the dielectric substrate 130 in the designated regions A1 and A2 are each also referred to as "designated portion 131", and a portion of the dielectric substrate 130 other than the designated regions 131 is also referred to as "base potion 135".

In the dielectric substrate 130 according to the present embodiment, the dielectric in the designated regions A1 and A2 is trimmed such that the designated portions 131 in the respective designated regions A1 and A2 are thinner than the base portion 135 including the non-adjustment region B. Therefore, the effective dielectric constant in each of the designated regions A1 and A2 is different from the effective dielectric constant in the non-adjustment region B. More specifically, the effective dielectric constant in each of the designated regions A1 and A2 is smaller than the effective dielectric constant in the non-adjustment region B.

Herein, the effective dielectric constant refers to the total dielectric constant in an area spreading from the level where the grounding electrode GND is located up to the level where the radiating element 121 is located. Accordingly, in the present embodiment, the effective dielectric constant in each of the designated regions A1 and A2 refers to the dielectric constant in an area as a combination of the designated portion 131 and a space (each of the hatched parts in FIG. 3) resulting from the trimming in the designated region A1 or A2. Furthermore, the effective dielectric constant in the non-adjustment region B refers to the dielectric constant of the base portion 135 in the non-adjustment region B. If the grounding electrode GND is provided on another substrate separate from the dielectric substrate 130, the effective dielectric constant in each of the above regions refers to the total dielectric constant in an area spreading from the level of the another substrate where the grounding electrode GND is located up to the level of the dielectric substrate 130 where the radiating element 121 is located.

As illustrated in FIG. 2, in the plan view of the designated regions A1 and A2 seen in the Z-axis direction, each of the designated regions A1 and A2 overlaps the grounding electrode GND. Specifically, in the plan view of the designated regions A1 and A2 seen in the Z-axis direction, it is not necessary that the designated regions A1 and A2 are each positioned within the grounding electrode GND but is only necessary that at least a portion of each of the designated regions A1 and A2 coincides with the grounding electrode GND. Alternatively, in view of the object of reducing the effective dielectric constants in the designated regions A1 and A2, the designated regions A1 and A2 may each be positioned within the grounding electrode GND.

As described above, in the antenna device 120 according to the present embodiment, the effective dielectric constants in the designated regions A1 and A2 included in the adjustment regions A1 to A4 are made smaller than the effective dielectric constant in the non-adjustment region B. Thus, the characteristics of the harmonic wave to be radiated from the antenna device are adjusted such that the influence of the harmonic wave upon peripheries is reduced while the characteristics of the fundamental wave are maintained, compared with the case of an antenna device corresponding to known arts that does not include the designated regions A1 and A2.

The characteristics of the harmonic wave and the characteristics of the fundamental wave exhibited by the antenna device 120 according to the present embodiment will now be described in that order. The following description relates to a case where the frequency of the fundamental wave (fundamental frequency) that is regarded as the target output frequency is "28 GHz".

(Characteristics of Harmonic Wave)

The characteristics of the harmonic wave exhibited by the antenna device 120 will first be described.

Figure 5:
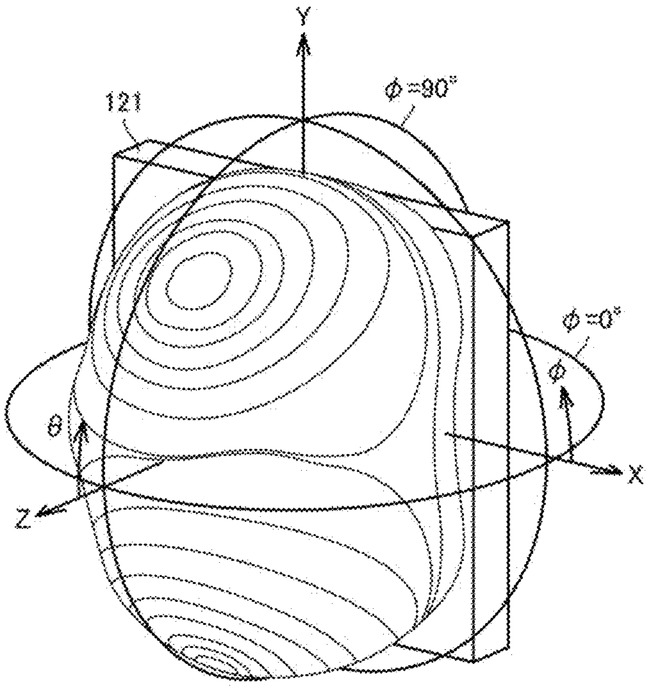
FIG. 5 is a three-dimensional illustration of the gain of a harmonic wave.

FIG. 5 is a three-dimensional illustration of the gain of the harmonic wave contained in the radio wave radiated from the radiating element 121. In FIG. 5, the angle with respect to the X axis and about the Z axis is denoted by "φ", and the angle with respect to the Z axis and about the X axis is denoted by "θ". As illustrated in FIG. 5, the gain of the harmonic wave has two peaks at an angle φ about the Z axis of 90°.

Figure 6:
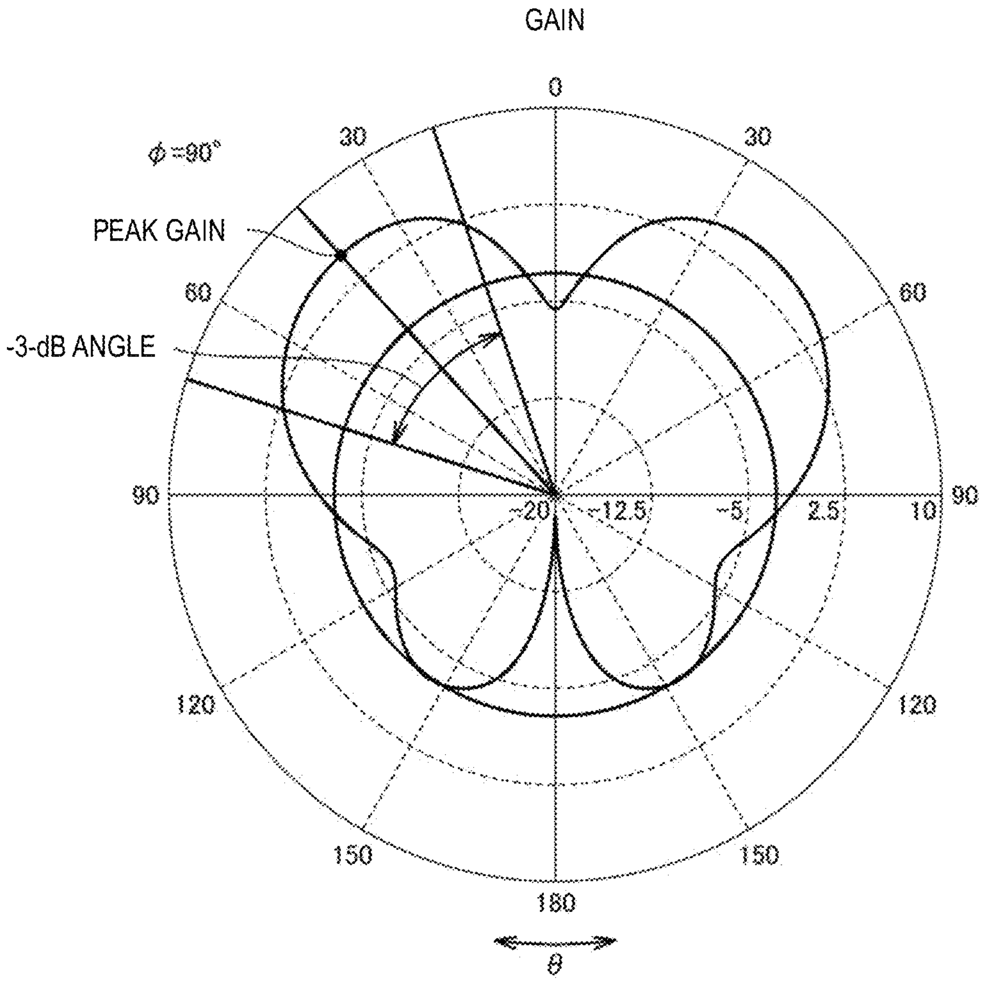
FIG. 6 is an illustration of the gain of the harmonic wave.
Figures 7, 8:
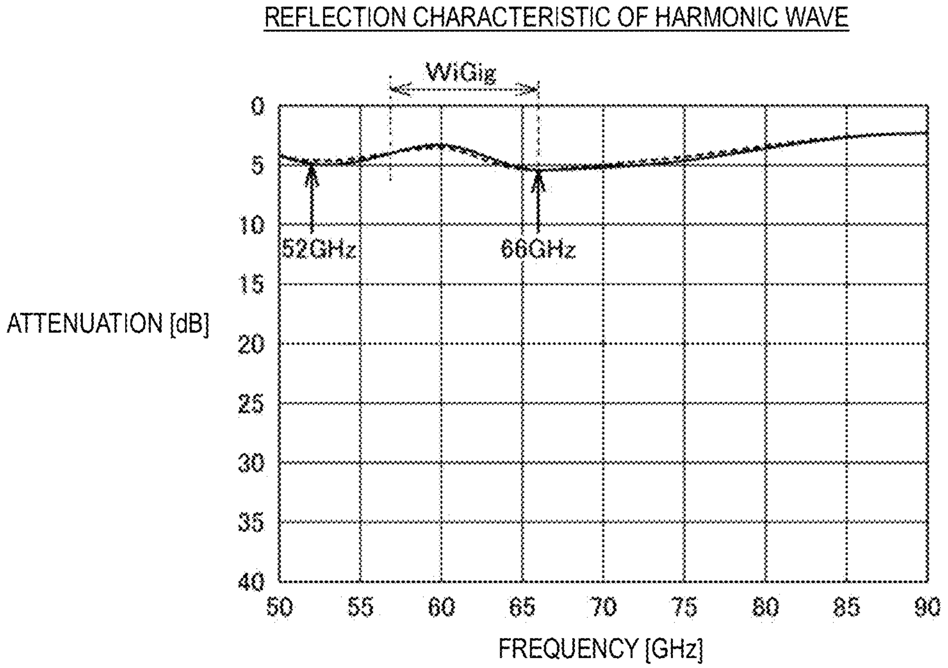
FIG. 7 illustrates the reflection characteristic of the harmonic wave.
FIG. 8 is a table summarizing the peak gain and the −3-dB angle of the harmonic wave.

FIG. 6 is an illustration of the gain of the harmonic wave at the angle φ about the Z axis of 90°, with the angle θ about the X axis being taken as a parameter. In the present embodiment, the maximum gain of the harmonic wave illustrated in FIG. 6 is defined as the "peak gain" of the harmonic wave, and the range of the angle θ where the gain of the harmonic wave is 3 dB down from the peak gain is defined as the "−3-dB angle" of the harmonic wave. In FIG. 8 to be referred to below, the "−3-dB angle" of the harmonic wave is taken as one of the characteristics of the harmonic wave. The "−3-dB angle" of the harmonic wave corresponds to the angle of radiation of the harmonic wave.

FIG. 7 illustrates the reflection characteristic of the harmonic wave. In FIG. 7, the horizontal axis represents frequency (GHz), and the vertical axis represents return loss in terms of attenuation (dB). Return loss is the ratio of the reflection level to the input level that is expressed in decibel (dB). Hence, the smaller (the closer to 0) the return loss, the greater the ratio of the reflection level to the input level, that is, the less harmonic wave to be radiated. Considering that a frequency of 56 GHz, which is twice the fundamental frequency of 28 GHz, is within a millimeter-order waveband with a center frequency of 60 GHz, FIG. 7 illustrates the result of a measurement of return loss in the range of 50 GHz to 90 GHz.

In FIG. 7, the solid line represents the characteristic of the harmonic wave exhibited by the antenna device 120 according to the present disclosure that includes the designated regions A1 and A2. The broken line represents the frequency characteristic exhibited by an antenna device according to a comparative example corresponding to known arts (an antenna device corresponding to known arts) that does not include the designated regions A1 and A2.

It is understood from FIG. 7 that the antenna device 120 according to the present disclosure is less likely to radiate the harmonic wave with the return loss being maintained at a small value, as with the case of the antenna device according to the comparative example. In a communication protocol called WiGig (wireless gigabit), a frequency band of 57 GHz to 66 GHz tends to be used. The antenna device 120 according to the present disclosure is less likely to radiate the harmonic wave in the frequency band of 57 GHz to 66 GHz as well, which reduces the influence upon WiGig communication.

It is also understood from FIG. 7 that the antenna device 120 according to the present disclosure is more likely to radiate the harmonic wave at frequencies of 52 GHz and 66 GHz, where the return loss of the harmonic wave has local maxima. Therefore, in the present embodiment, the frequencies of 52 GHz and 66 GHz where the harmonic wave is more likely to be radiated were each defined as frequency F0, and the −3-dB angle of the harmonic wave at the frequency F0 was measured.

FIG. 8 is a table summarizing the peak gain and the −3-dB angle of the harmonic wave at the frequencies F0 (52 GHz and 66 GHz) where the harmonic wave is more likely to be radiated. The antenna device 120 according to the present disclosure exhibits a −3-dB angle that is smaller than in the comparative example corresponding to known arts at both the frequencies of 52 GHz and 66 GHz. That is, the angle of radiation of the harmonic wave from the antenna device 120 according to the present disclosure is narrower than from the antenna device corresponding to known arts. Thus, the influence of the harmonic wave upon peripheries is reduced.

(Characteristics of Fundamental Wave)

The characteristics of the fundamental wave exhibited by the antenna device 120 will now be described. As with the above description, the following description relates to the case where the frequency of the fundamental wave is "28 GHz".

Figure 9:
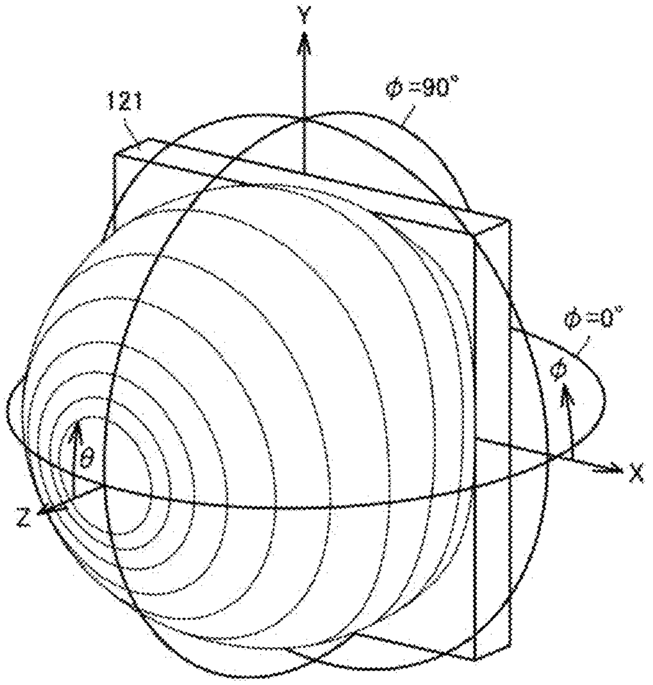
FIG. 9 is a three-dimensional illustration of the gain of a fundamental wave.

FIG. 9 is a three-dimensional illustration of the gain of the fundamental wave contained in the radio wave radiated from the radiating element 121. In FIG. 9, as with FIG. 5, the angle with respect to the X axis and about the Z axis is denoted by "φ", and the angle with respect to the Z axis and about the X axis is denoted by "θ". As illustrated in FIG. 9, the gain of the fundamental wave has a peak on the positive side in the Z-axis direction.

Figure 10:
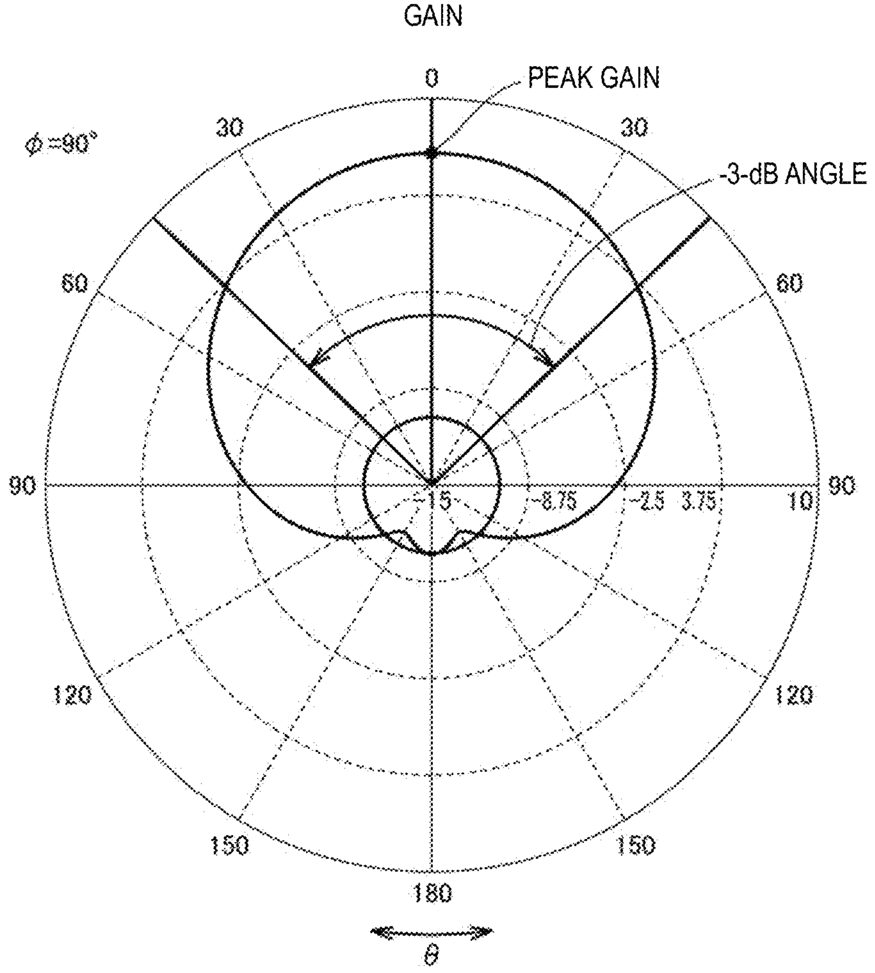
FIG. 10 is an illustration of the gain of the fundamental wave.

FIG. 10 is an illustration of the gain of the fundamental wave at the angle φ about the Z axis of 90°, with the angle θ about the X axis being taken as a parameter. In the present embodiment, the maximum gain of the fundamental wave illustrated in FIG. 10 is defined as the "peak gain" of the fundamental wave, and the range of the angle θ where the gain of the fundamental wave decreases from the peak gain by 3 dB is defined as the "−3-dB angle" of the fundamental wave. The "−3-dB angle" of the fundamental wave corresponds to the angle of radiation of the fundamental wave.

Figure 11:
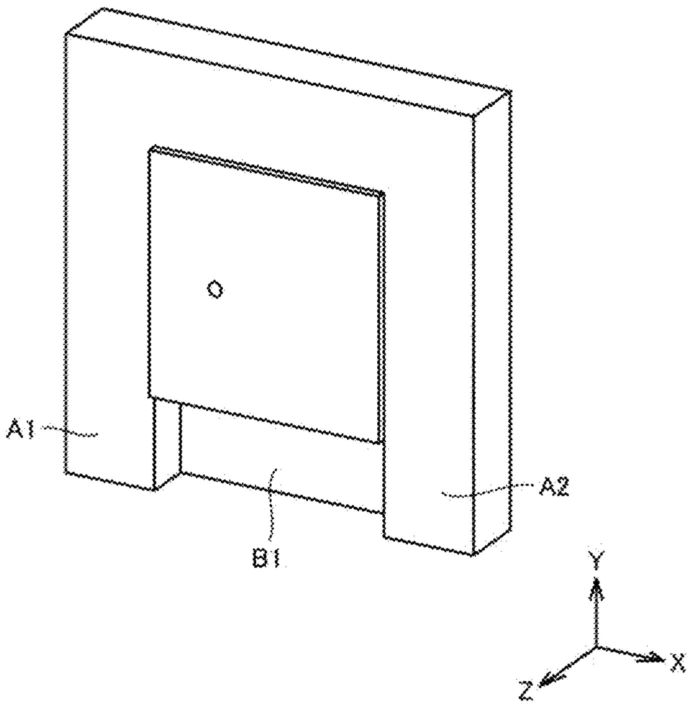
FIG. 11 is a perspective view of an antenna device according to Comparative Example 1.
Figure 12:
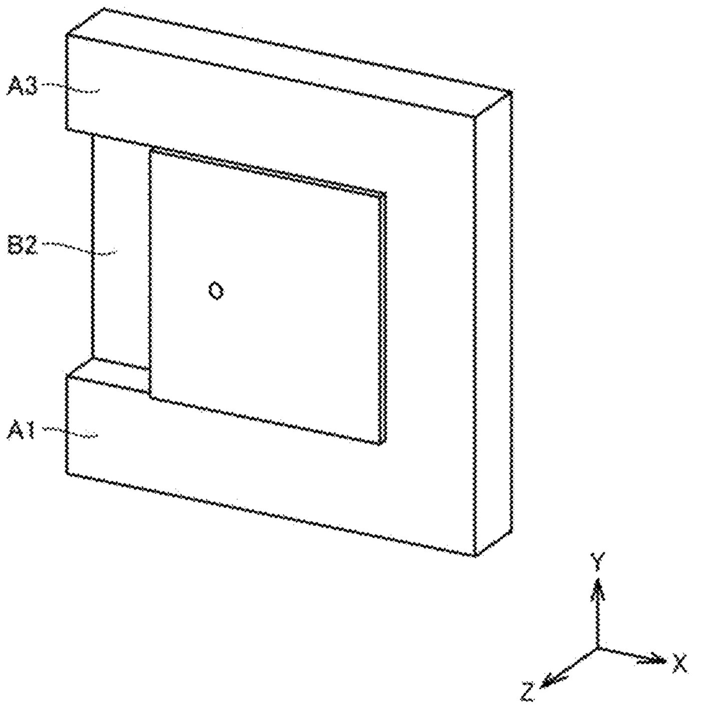
FIG. 12 is a perspective view of an antenna device according to Comparative Example 2.

The characteristics of the fundamental wave were evaluated in comparison with those of the antenna device according to the comparative example corresponding to known arts and with those of antenna devices according to Comparative Examples 1 and 2. FIG. 11 is a perspective view of an antenna device according to Comparative Example 1. The antenna device according to Comparative Example 1 is obtained from the antenna device according to the comparative example corresponding to known arts by trimming, or thinning, the dielectric in a region B1, which is between the adjustment region A1 and the adjustment region A2. FIG. 12 is a perspective view of an antenna device according to Comparative Example 2. The antenna device according to Comparative Example 2 is obtained from the antenna device according to the comparative example corresponding to known arts by trimming, or thinning, the dielectric in a region B2, which is between the adjustment region A1 and the adjustment region A3.

Figure 13:
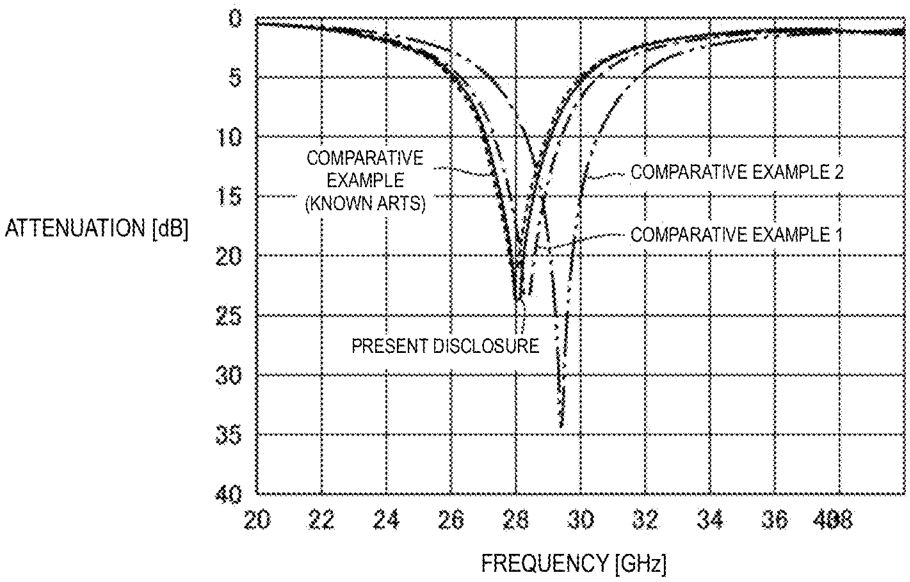
FIG. 13 illustrates the reflection characteristics of the fundamental wave.

FIG. 13 illustrates the reflection characteristic of the fundamental wave. In FIG. 13, as with FIG. 7 referred to above, the horizontal axis represents frequency (GHz), and the vertical axis represents return loss in terms of attenuation (dB). The greater (the farther from 0) the return loss, the smaller the ratio of the reflection level to the input level, that is, the more fundamental wave to be radiated.

In FIG. 13, the solid line represents the characteristic of the fundamental wave exhibited by the antenna device 120 according to the present disclosure. The broken line represents the characteristic of the fundamental wave exhibited by the antenna device according to the comparative example corresponding to known arts. The one-dot chain line represents the characteristic of the fundamental wave exhibited by the antenna device according to Comparative Example 1. The two-dot chain line represents the characteristic of the fundamental wave exhibited by the antenna device according to Comparative Example 2. Note that FIG. 13 illustrates the characteristic obtained by inputting the same radio-frequency signal to the individual radiating elements.

As illustrated in FIG. 13, in the present disclosure (the solid line), the frequency, f0, where the return loss of the fundamental wave has a local maximum is maintained at 28 GHz, which is the same as in the comparative example corresponding to known arts (the broken line). That is, in the antenna device 120 according to the present disclosure, the frequency characteristic of the fundamental wave is maintained to be the same as in the comparative example corresponding to known arts.

In contrast, in Comparative Example 1 (the one-dot chain line), the frequency f0 where the return loss of the fundamental wave has a local maximum is higher than 28 GHz. Moreover, in Comparative Example 2 (the two-dot chain line), the frequency f0 where the return loss of the fundamental wave has a local maximum is significantly higher than 28 GHz, being over 29 GHz. Such a result shows that the characteristic of the fundamental wave is not maintained in either Comparative Example 1 or 2.

FIG. 14 is a table summarizing the peak gain, the peak angle, and the −3-dB angle of the fundamental wave. In the present disclosure, as described above, there is no change in the frequency f0 where the return loss of the fundamental wave has a local maximum: the fundamental frequency is maintained at 28 GHz, the same as in the comparative example corresponding to known arts. In contrast, in each of Comparative Examples 1 and 2, there is a change in the frequency f0: the fundamental frequency is not maintained at 28 GHz.

In the present disclosure, there is no change in the −3-dB angle as well from the value in the comparative example corresponding to known arts. That is, the angle of radiation of the fundamental wave is maintained. In contrast, in each of Comparative Examples 1 and 2, there is a change in the −3-dB angle. Specifically, the −3-dB angle is smaller than that of the comparative example corresponding to known arts. That is, the angle of radiation of the fundamental wave is narrowed, showing the deterioration in the characteristic of the fundamental wave.

In each of Comparative Examples 1 and 2, it is considered as follows: the effective dielectric constant in a region (the region B1 illustrated in FIG. 11 or the region B2 illustrated in FIG. 12) that is more likely to be influenced by the electromagnetic field was reduced by trimming, which increased the peak gain of the fundamental wave, resulting in the above change in the −3-dB angle.

FIG. 15 is a table summarizing the peak gain, the peak angle, and the −3-dB angle of the fundamental wave, with the sizes of the radiating elements according to Comparative Examples 1 and 2 adjusted such that the frequency f0 where the return loss of the fundamental wave has a local maximum becomes 28 GHz. As summarized in FIG. 15, even by adjusting the sizes of the radiating elements according to Comparative Examples 1 and 2 such that the frequency f0 becomes 28 GHz, the −3-dB angles in Comparative Examples 1 and 2 are narrowed, showing the deterioration in the characteristic of the fundamental wave.

To summarize, the antenna device 120 according to the present embodiment includes the plate-shaped radiating element 121 that radiates a radio wave polarized in the X-axis direction, and the dielectric substrate 130 that carries the radiating element 121. In the dielectric substrate 130, the dielectric in each of the designated regions A1 and A2, included in the adjustment regions A1 to A4 around the radiating element 121 on the outer side with respect to the first boundary planes L1 and on the outer side with respect to the second boundary planes L2, is thinner than the dielectric in the non-adjustment region B. Such a configuration makes the effective dielectric constant in each of the designated regions A1 and A2 smaller than the effective dielectric constant in the non-adjustment region B. Consequently, in the antenna device 120 according to the present embodiment, the characteristics of the harmonic wave are adjusted such that the influence of the harmonic wave upon peripheries is reduced while the characteristics of the fundamental wave are maintained, compared with the case of the antenna device corresponding to known arts that does not include the designated regions A1 and A2.

The "radiating element 121", the "grounding electrode GND", and the "dielectric substrate 130" according to the present embodiment may correspond to the "first radiating element", the "grounding electrode", and the "dielectric substrate" according to the present disclosure, respectively. The "first boundary planes L1" and the "second boundary planes L2" according to the present embodiment may correspond to the "first boundary planes" and the "second boundary planes" according to the present disclosure, respectively. The "adjustment regions A1 to A4" and the "non-adjustment region B" according to the present embodiment may correspond to the "adjustment regions" and the "non-adjustment region" according to the present disclosure, respectively. The "designated regions A1 and A2" according to the present embodiment may each correspond to the "designated region" according to the present disclosure.

[Variations]

Variations of the antenna device 120 will now be described.

(Variation 1)

The above embodiment relates to a case where the two adjustment regions A1 and A2 among the four adjustment regions A1 to A4 are each defined as "designated region" where the effective dielectric constant is smaller than in the non-adjustment region B. The number and the combination of designated regions are not limited to the above. For example, only any one of the four adjustment regions A1 to A4 may be defined as the designated region, any three of the four adjustment regions A1 to A4 may be defined as the designated regions, or all of the four adjustment regions A1 to A4 may be defined as the designated regions.

The above embodiment relates to a case where the dielectric in each of the adjustment regions A1 and A2 is made thinner than the dielectric in the non-adjustment region B, whereby the adjustment regions A1 and A2 are each obtained as the "designated region" where the effective dielectric constant is smaller than in the non-adjustment region B. The method of obtaining the "designated region" from each of the adjustment regions A1 and A2 is not limited to the above. For example, the entirety of the dielectric in each of the adjustment regions A1 and A2 may be cut away. As another example, the dielectric in each of the adjustment regions A1 and A2 may be shaped stepwise, whereby the effective dielectric constant therein may be adjusted more finely. As yet another example, the space in each of the adjustment regions A1 and A2 that is provided as a result of trimming may be filled with a material having a dielectric constant lower than the dielectric constant of the designated portion 131, whereby the effective dielectric constant in each of the adjustment regions A1 and A2 may be made different from the effective dielectric constant in the non-adjustment region B.

(Variation 2)

Figure 16:
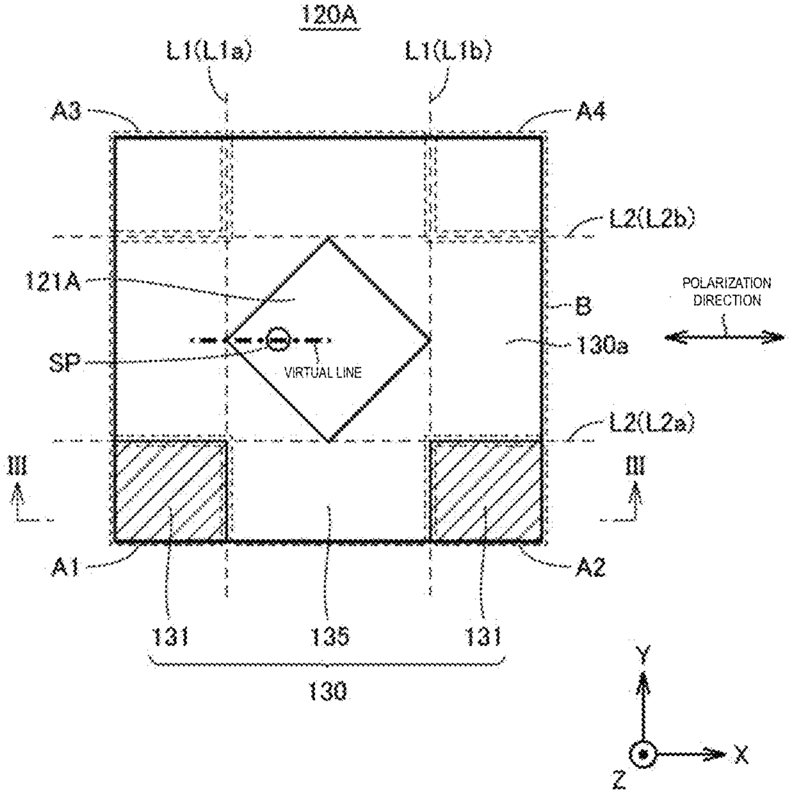
FIG. 16 is a plan view (No. 2) of an antenna device.

FIG. 16 is a plan view of an antenna device 120A according to Variation 2. The antenna device 120A is obtained by changing the radiating element 121 of the above antenna device 120 illustrated in FIG. 2 to a radiating element 121A.

The radiating element 121A seen in the Z-axis direction has a rectangular shape defined by four sides each intersecting the X-axis direction. Thus, the radiating element 121 may be varied. The shape of the radiating element 121A is not limited to a rectangle and may be a polygon with five or more corners.

Figure 17:
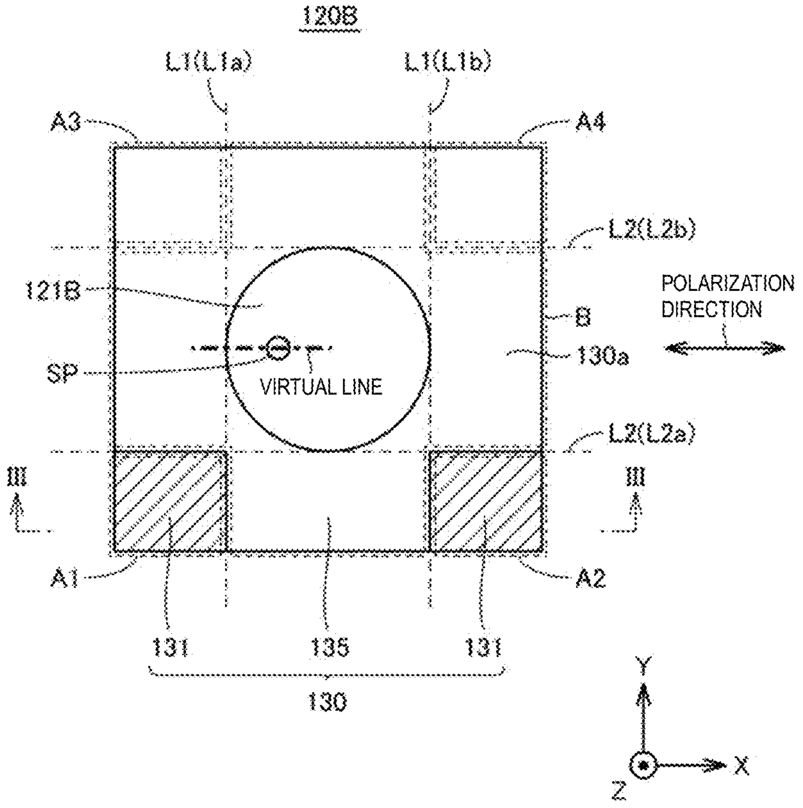
FIG. 17 is a plan view (No. 3) of an antenna device.

FIG. 17 is a plan view of another antenna device 120B according to Variation 2. The antenna device 120B is obtained by changing the radiating element 121 of the above antenna device 120 illustrated in FIG. 2 to a radiating element 121B, which has a substantially circular shape.

Thus, the radiating element 121 may be varied. The shape of the radiating element 121B is not limited to a circle and may be an oval.

(Variation 3)

Figure 18:
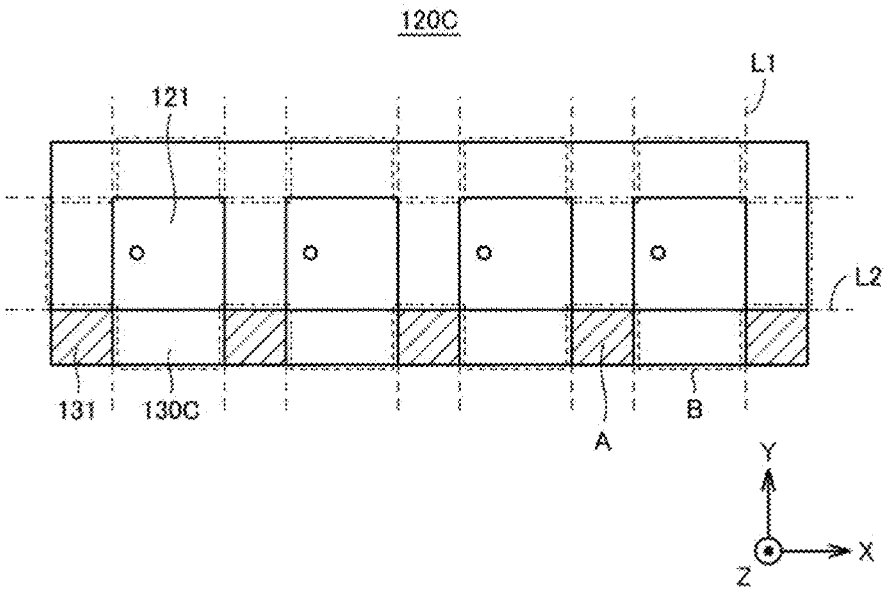
FIG. 18 is a plan view (No. 4) of an antenna device.
Figure 19:
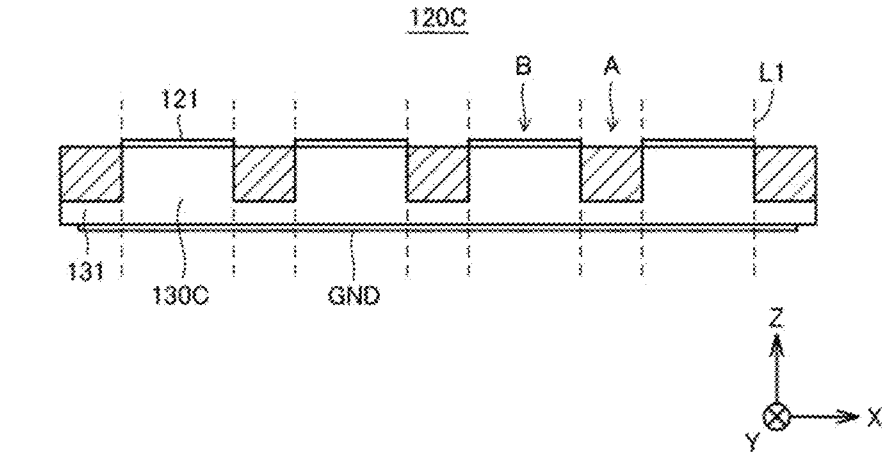
FIG. 19 is a side view of the antenna device.

FIG. 18 is a plan view of an antenna device 120C according to Variation 3. FIG. 19 is a side view, in the Y-axis direction, of the antenna device 120C according to Variation 3. The antenna device 120C includes a plurality of radiating elements 121, unlike the above antenna device 120 illustrated in FIG. 2. That is, the antenna device 120C according to Variation 3 is an array antenna in which a plurality of radiating elements 121 are arranged side by side at predetermined intervals in the X-axis direction on a dielectric substrate 130C. The antenna device 120C also includes designated regions A (the hatched parts) where the effective dielectric constant is different from the effective dielectric constant in the non-adjustment region, whereby the advantageous effects produced by the above embodiment are produced.

Letting adjacent two of the radiating elements 121 be a first radiating element and a second radiating element, respectively, the designated region A defined between the first radiating element and the second radiating element is located at the overlap between an adjustment region of the first radiating element and an adjustment region of the second radiating element.

Each two adjacent radiating elements 121 according to Variation 3 may correspond to the "first radiating element" and the "second radiating element" according to the present disclosure, respectively.

(Variation 4)

Figure 20:
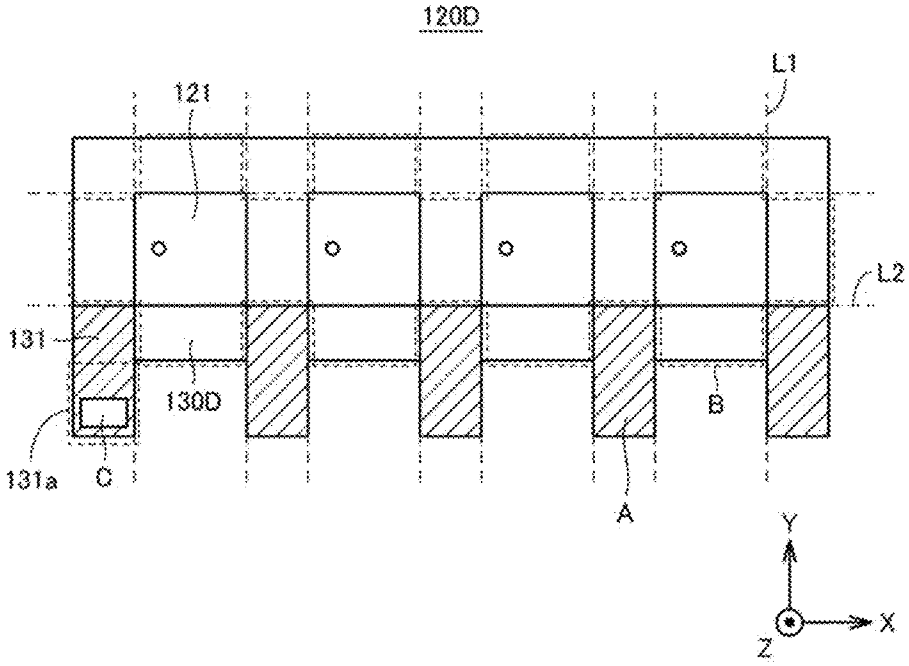
FIG. 20 is a plan view (No. 5) of an antenna device.

FIG. 20 is a plan view of an antenna device 120D according to Variation 4. The antenna device 120D is different from the above antenna device 120C according to Variation 3 illustrated in FIG. 18 in that the designated portions 131, which are dielectric in the designated regions (the hatched parts), have projections 131*a*. The projections 131*a* project with respect to the dielectric in the non-adjustment regions toward the negative side in the Y-axis direction (an in-plane direction of the dielectric). Such a variation also produces the advantageous effects produced by the above embodiment. In addition, some of the projections 131*a* may each be provided with a connector C, through which the antenna device 120D is to be connected to another component.

The "projection 131*a*" and the "connector C" according to Variation 4 may correspond to the "projection" and the "component provided to the projection" according to the present disclosure, respectively.

(Variation 5)

Figure 21:
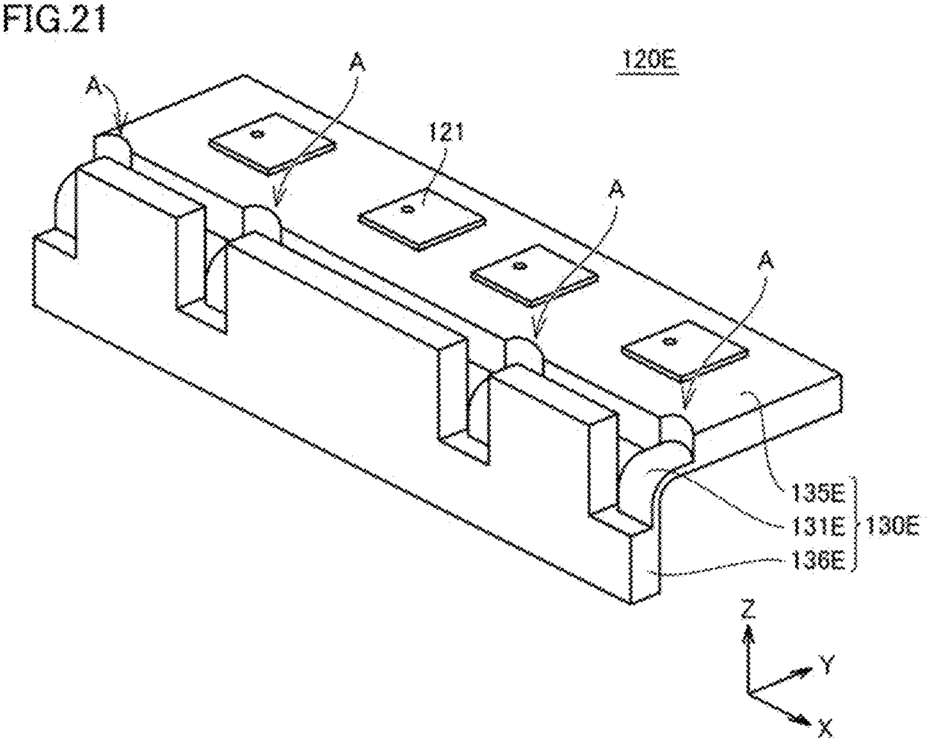
FIG. 21 is a perspective view (No. 2) of an antenna device.

FIG. 21 is a perspective view of an antenna device 120E according to Variation 5. The antenna device 120E includes a dielectric substrate 130E, which carries a plurality of radiating elements 121. The dielectric substrate 130E has a substantially L shape and includes a first base portion 135E, a second base portion 136E, and curved portions 131E. The first base portion 135E has designated regions A, in each of which the first base portion 135E is cut off in such a manner as to have an arc-shaped outline. The curved portions 131E project from the respective designated regions A of the first base portion 135E toward the negative side in the Y-axis direction and are connected in a curved state to the second base portion 136E. Since the antenna device 120E also includes the designated regions A where the effective dielectric constant is different from the effective dielectric constant in the non-adjustment region, the advantageous effects produced by the above embodiment are produced.

The "first base portion 135E", the "second base portion 136E", the "curved portion 131E", and the "designated region A" according to Variation 4 may correspond to the "dielectric substrate", the "another dielectric substrate", the "projection", and the "designated region" according to the present disclosure, respectively.

(Variation 6)

Figure 22:
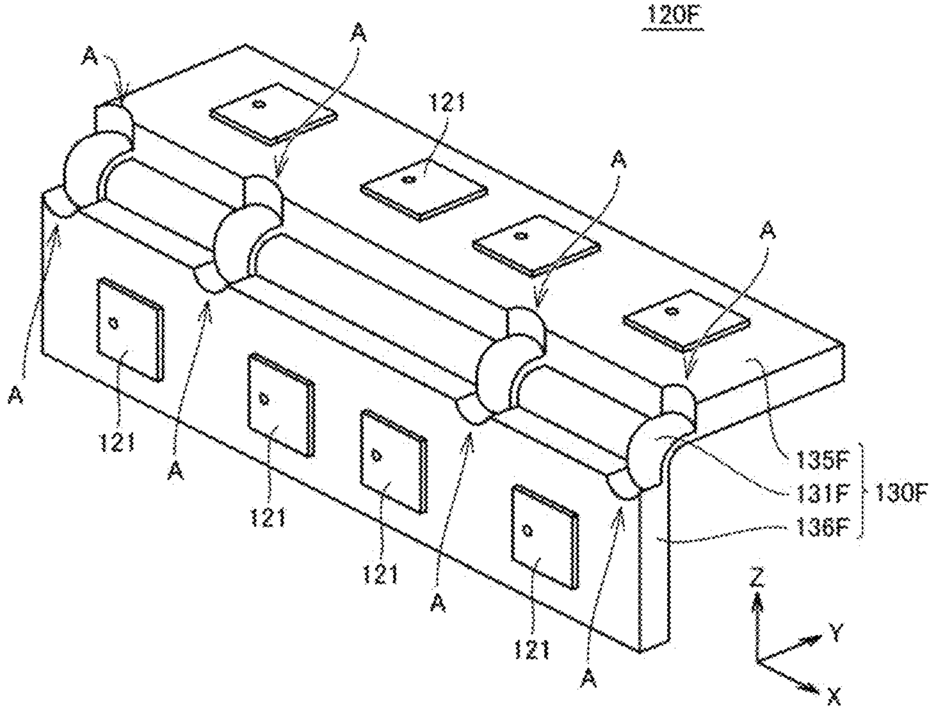
FIG. 22 is a perspective view (No. 3) of an antenna device.

FIG. 22 is a perspective view of an antenna device 120F according to Variation 6. The antenna device 120F includes a dielectric substrate 130F, which has a substantially L shape. The dielectric substrate 130F includes a first base portion 135F, a second base portion 136F, and curved portions 131F. The first base portion 135F carries a plurality of radiating elements 121. The second base portion 136F carries a plurality of radiating elements 121. The first base portion 135F has designated regions A, in each of which the first base portion 135F is cut off in such a manner as to have an arc-shaped outline. The second base portion 136F also has designated regions A, in each of which the second base portion 136F is cut off in such a manner as to have an arc-shaped outline. The curved portions 131F project from the respective designated regions A of the first base portion 135F toward the negative side in the Y-axis direction and are connected in a curved state to the respective designated regions A of the second base portion 136F. The antenna device 120F configured as above also produces the advantageous effects produced by the above embodiment.

The "first base portion 135F", the "second base portion 136F", the "curved portion 131F", and the "designated region A" according to Variation 6 may correspond to the "dielectric substrate", the "another dielectric substrate", the "projection", and the "designated region" according to the present disclosure, respectively.

(Variation 7)

The above embodiment relates to a case where the characteristics of the harmonic wave are adjusted by making the dielectric in each of the adjustment regions A1 and A2 thinner than the dielectric in the non-adjustment region B.

Alternatively, the characteristics of the harmonic wave may be adjusted by making the dielectric in each of the adjustment regions A1 and A2 thicker than the dielectric in the non-adjustment region B.

Figure 23:
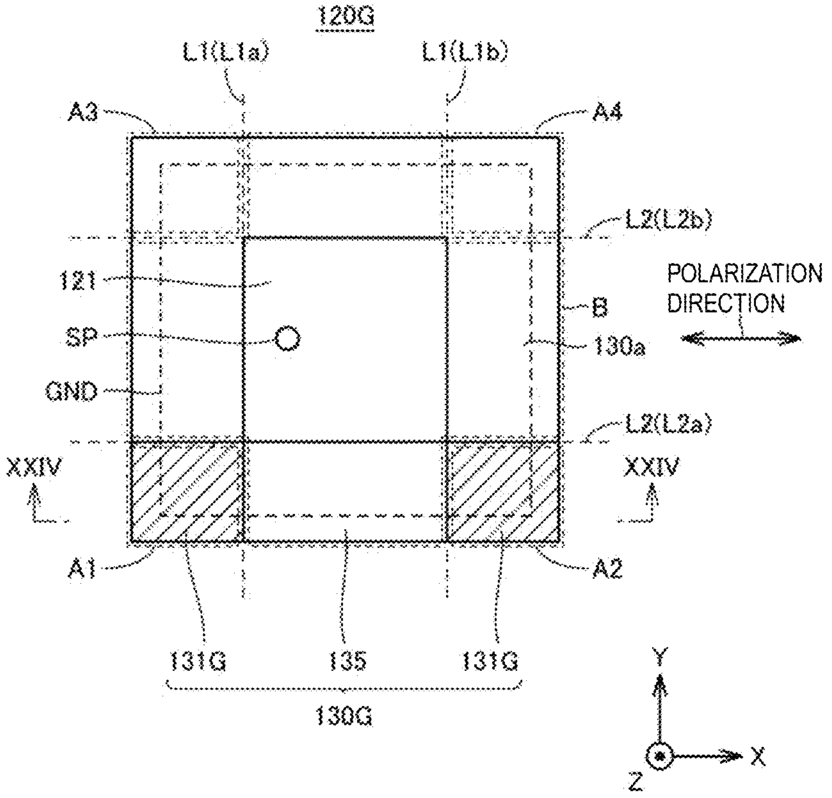
FIG. 23 is a plan view (No. 6) of an antenna device.
Figure 24:
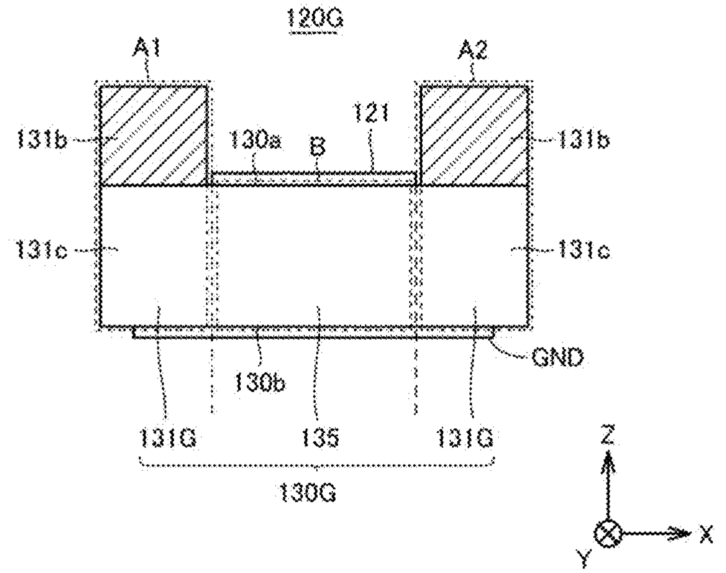
FIG. 24 is a sectional view (No. 2) of the antenna device.

FIG. 23 is a plan view of an antenna device 120G according to Variation 7. FIG. 24 is a sectional view of the antenna device 120G taken along line XXIV-XXIV illustrated in FIG. 23.

The antenna device 120G is obtained by changing the dielectric substrate 130 of the above antenna device 120 to a dielectric substrate 130G. The dielectric substrate 130G is obtained by changing the designated portions 131 of the above dielectric substrate 130 to designated portions 131G.

In the antenna device 120G according to Variation 7, the dielectric forming the designated portions 131G is thicker than the dielectric in the non-adjustment region B. More specifically, in the antenna device 120G, the designated portions 131G are formed by providing dielectric 131*b* (the hatched parts in FIGS. 23 and 24) on dielectric 131*c* in the adjustment regions A1 and A2. The dielectric 131*c* has the same height as the dielectric in the non-adjustment region B. Thus, the dielectric forming the designated portions 131 is made thicker than the dielectric in the non-adjustment region B. Such a configuration makes the effective dielectric constant of each of the designated portions 131G different from the effective dielectric constant in the non-adjustment region B.

Thus, the adjustment of the characteristics of the harmonic wave may be achieved by making the dielectric in the adjustment regions A1 and A2 thicker than the dielectric in the non-adjustment region B.

Each region where the effective dielectric constant is different from the effective dielectric constant in the non-adjustment region B may have a shape other than a rectangle when seen in the Z-axis direction and may be defined only at the end of the substrate.

(Variation 8)

The above embodiment relates to a case where an area in each of the adjustment regions A1 and A2 that exhibits a different effective dielectric constant from the non-adjustment region B is located in an upper layer of the dielectric.

The area in each of the adjustment regions A1 and A2 that exhibits a different effective dielectric constant from the non-adjustment region B does not necessarily need to be located in an upper layer of the dielectric and may be located in an inner or lower layer of the dielectric.

Figure 25:
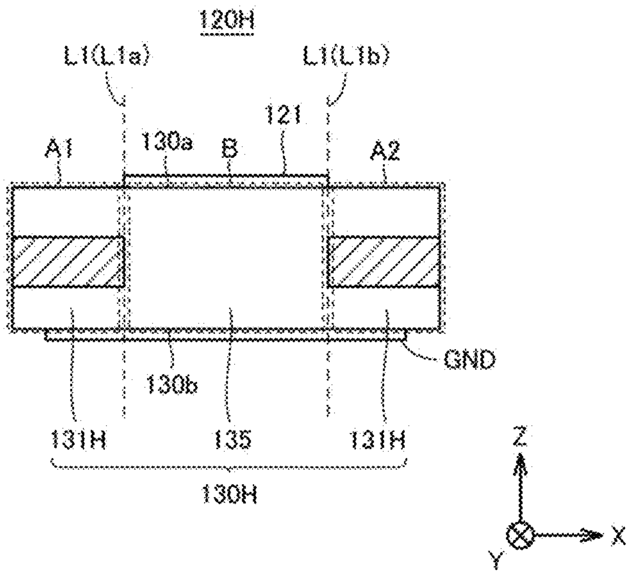
FIG. 25 is a sectional view (No. 3) of an antenna device.

FIG. 25 is a sectional view of an antenna device H according to Variation 8. The antenna device 120H is obtained by changing the dielectric substrate 130 of the above antenna device 120 to a dielectric substrate 130H. The dielectric substrate 130H is obtained by changing the designated portions 131 of the above dielectric substrate 130 to designated portions 131H. In each of the designated portions 131H of the antenna device 120H, the area (each of the hatched parts in FIG. 25) exhibiting a different effective dielectric constant from the non-adjustment region B is located in an inner layer (a middle layer) of the dielectric.

Figure 26:
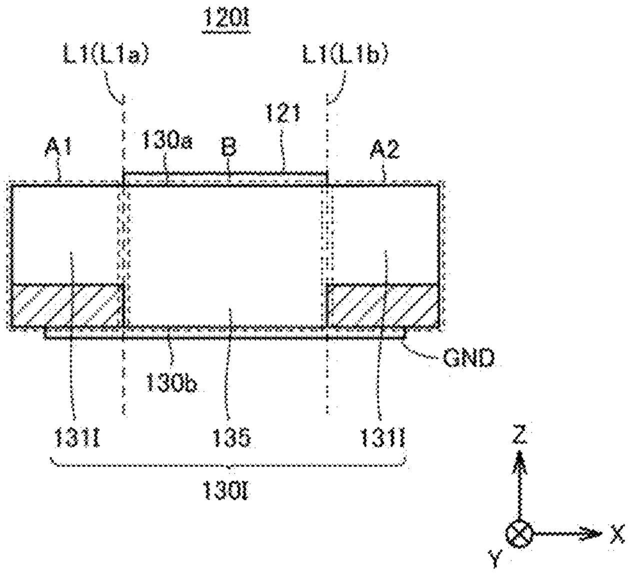
FIG. 26 is a sectional view (No. 4) of an antenna device.

FIG. 26 is a sectional view of another antenna device 120I according to Variation 8. The antenna device 120I is obtained by changing the dielectric substrate 130 of the above antenna device 120 to a dielectric substrate 130I. The dielectric substrate 130I is obtained by changing the designated portions 131 of the above dielectric substrate 130 to designated portions 131I. In each of the designated portions 131I of the antenna device 120I, the area (each of the hatched parts in FIG. 26) exhibiting a different effective dielectric constant from the non-adjustment region B is located in a lower layer of the dielectric.

As described above, the area in each of the adjustment regions A1 and A2 that exhibits a different effective dielectric constant from the non-adjustment region B may be located in an inner or lower layer of the dielectric.

(Variation 9)

The above embodiment relates to a case where the radiating element 121 and the grounding electrode GND are carried by a single dielectric substrate 130.

Alternatively, the radiating element 121 and the grounding electrode GND may be carried by separate dielectric substrates, respectively.

Figure 27:
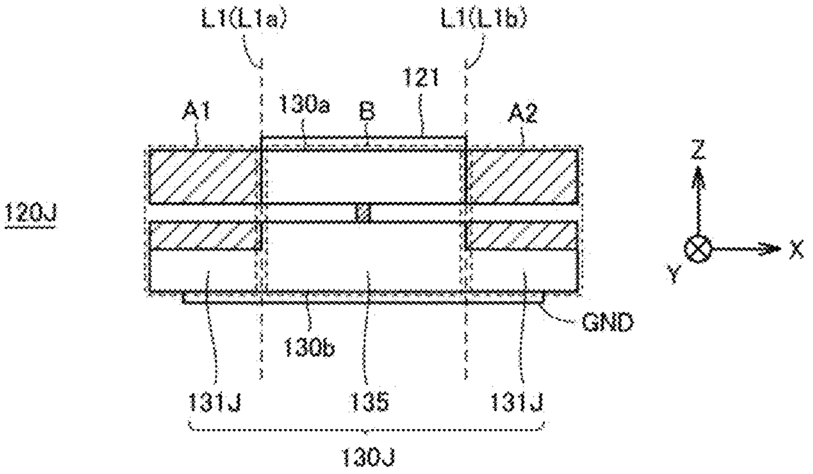
FIG. 27 is a sectional view (No. 5) of an antenna device.

FIG. 27 is a sectional view of an antenna device 120J according to Variation 9. The antenna device 120J is obtained by changing the dielectric substrate 130 of the above antenna device 120 to a dielectric substrate 130J. The dielectric substrate 130J includes separate substrates: a substrate carrying the radiating element 121, and a substrate carrying the grounding electrode GND. The dielectric substrate 130J includes designated portions 131J, in each of which the area (each of the hatched parts in FIG. 27) exhibiting a different effective dielectric constant from the non-adjustment region B spreads over the substrate carrying the radiating element 121 and a portion of the substrate carrying the grounding electrode GND.

Figure 28:
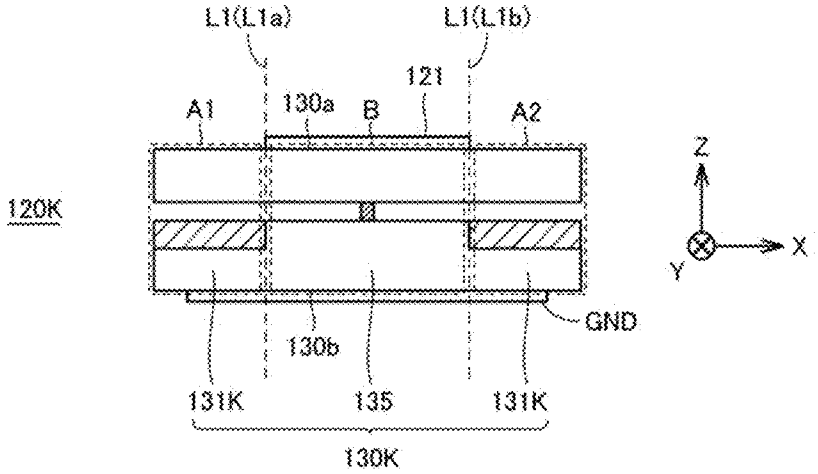
FIG. 28 is a sectional view (No. 6) of an antenna device.

FIG. 28 is a sectional view of another antenna device 120K according to Variation 9. The antenna device 120K is obtained by changing the dielectric substrate 130 of the above antenna device 120 to a dielectric substrate 130K. The dielectric substrate 130K includes separate substrates: a substrate carrying the radiating element 121, and a substrate carrying the grounding electrode GND. The dielectric substrate 130K includes designated portions 131K, in each of which the area (each of the hatched parts in FIG. 28) exhibiting a different effective dielectric constant from the non-adjustment region B is not located in the substrate carrying the radiating element 121 but is located only in a portion of the substrate carrying the grounding electrode GND.

Figure 29:
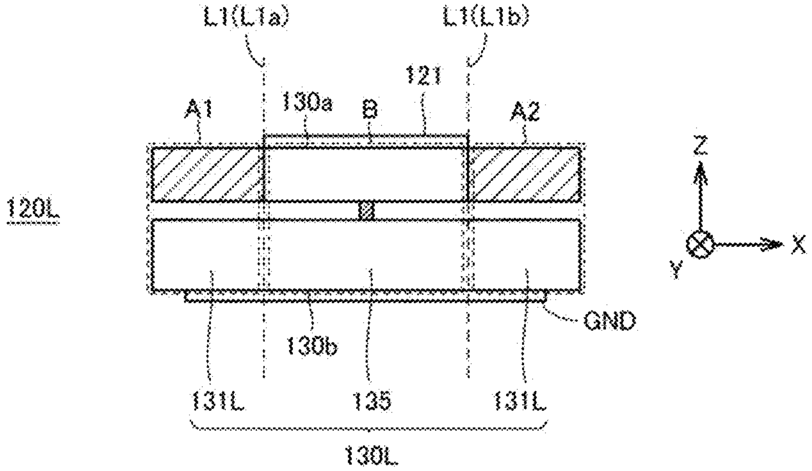
FIG. 29 is a sectional view (No. 7) of an antenna device.

FIG. 29 is a sectional view of an antenna device 120L according to Variation 9. The antenna device 120L is obtained by changing the dielectric substrate 130 of the above antenna device 120 to a dielectric substrate 130L. The dielectric substrate 130L includes separate substrates: a substrate carrying the radiating element 121, and a substrate carrying the grounding electrode GND. The dielectric substrate 130L includes designated portions 131L, in each of which the area (each of the hatched parts in FIG. 29) exhibiting a different effective dielectric constant from the non-adjustment region B is located only in the substrate carrying the radiating element 121, not in the substrate carrying the grounding electrode GND.

As in the above cases, the radiating element 121 and the grounding electrode GND may be carried by separate dielectric substrates, respectively.

(Variation 10)

In the antenna device 120D according to Variation 4 described above (see FIG. 20), the connector C is provided to each of some of the projections 131*a* projecting from the designated portions 131 toward the negative side in the Y-axis direction.

The connector C does not necessarily need to be provided to the projection 131*a* and may be provided to any of the designated portions 131.

Figure 30:
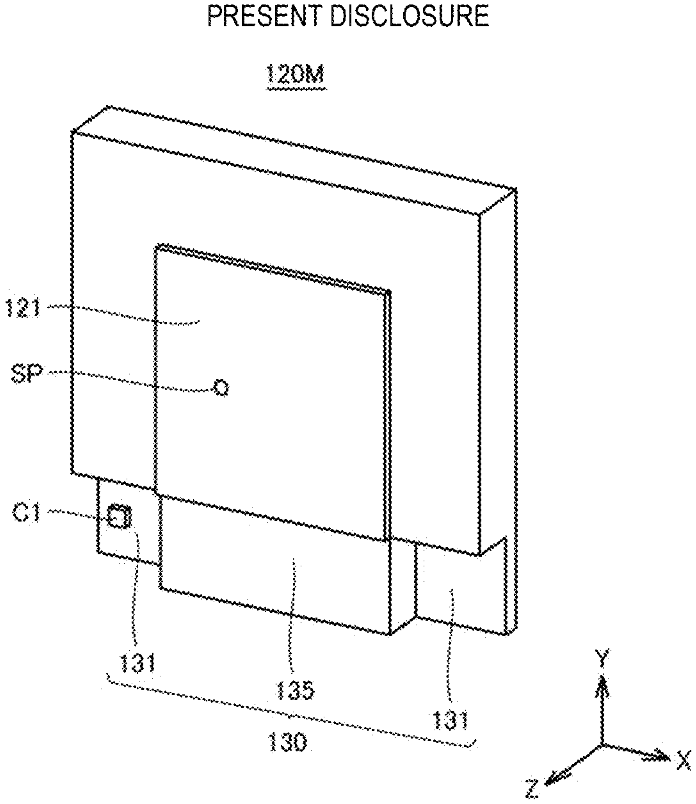
FIG. 30 is a perspective view (No. 4) of an antenna device.

FIG. 30 is a perspective view of an antenna device 120M according to Variation 10. The antenna device 120M is obtained by adding a connector C1 to each of some of the designated portions 131 of the above antenna device 120. Thus, the connector C1 is provided by utilizing a space resulting from the trimming of the dielectric, and an advantageous effect of adjusting the characteristics of the harmonic wave in the designated portions 131 is also expected.

(Variation 11)

Figure 31:
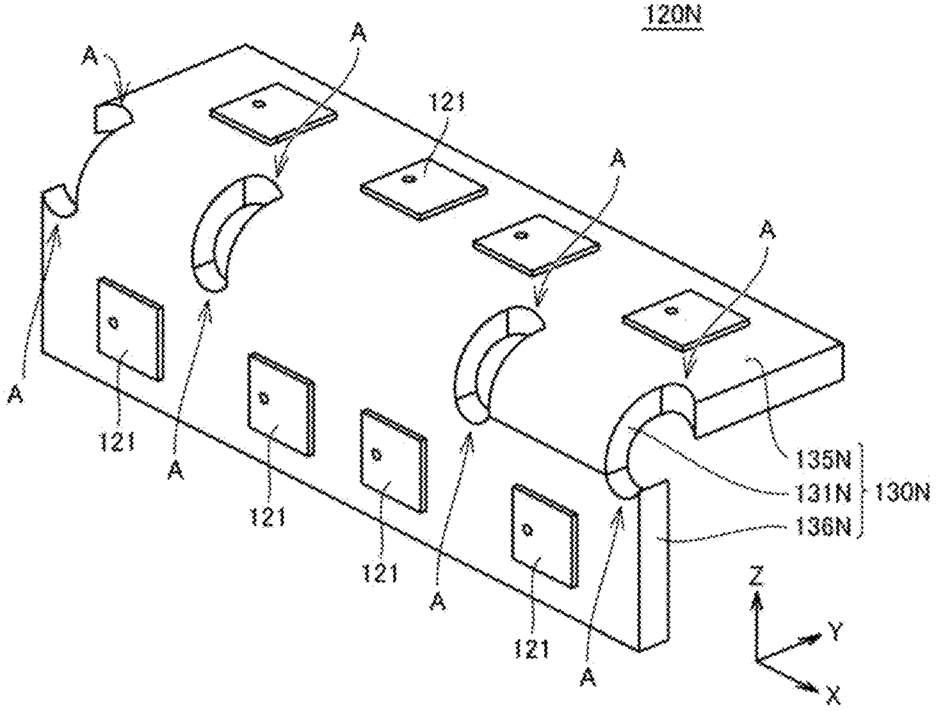
FIG. 31 is a perspective view (No. 5) of an antenna device.

FIG. 31 is a perspective view of an antenna device 120N according to Variation 11. The antenna device 120N includes a dielectric substrate 130N, which has a substantially L shape. The dielectric substrate 130N includes a first base portion 135N, a second base portion 136N, and curved portions 131N. The first base portion 135N carries a plurality of radiating elements 121. The second base portion 136N carries a plurality of radiating elements 121. The first base portion 135N has designated regions A, in each of which the first base portion 135N is cut off in such a manner as to have an arc-shaped outline. The second base portion 136N also has designated regions A, in each of which the second base portion 136N is cut off in such a manner as to have an arc-shaped outline.

The curved portions 131N extend from respective regions of the first base portion 135N that are other than the designated regions A in such a manner as to project with respect to the dielectric in the designated regions A toward the negative side in the Y-axis direction (an in-plane direction of the dielectric) and are connected in a curved state to respective regions of the second base portion 136N that are other than the designated regions A. Thus, the curved portions 131N projecting from the first base portion 135N may be provided in the regions of the first base portion 135N that are other than the designated regions A. The antenna device 120N configured as above also produces the advantageous effects produced by the above embodiment.

(Variation 12)

Figure 32:
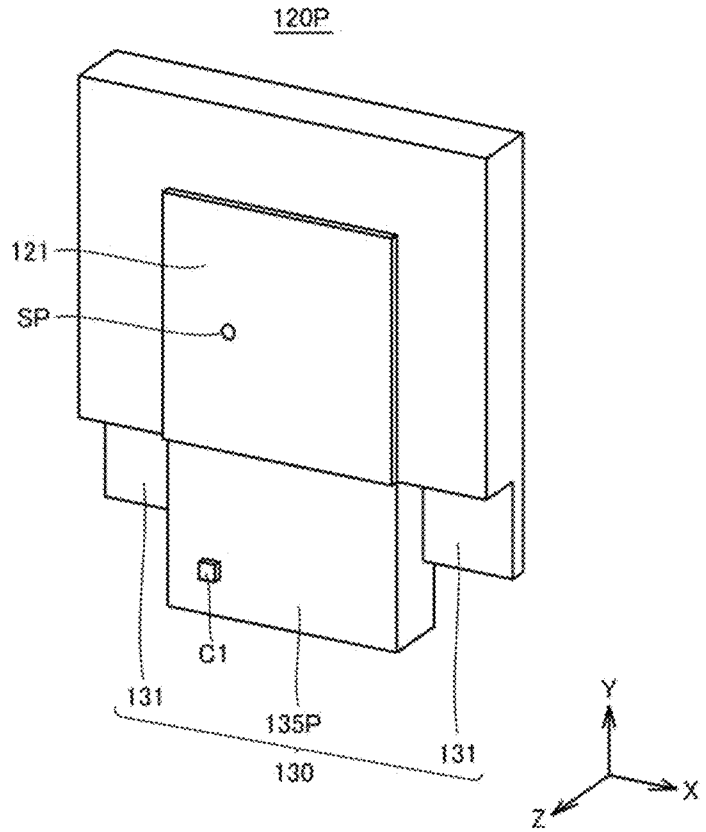
FIG. 32 is a perspective view (No. 6) of an antenna device.

FIG. 32 is a perspective view of an antenna device 120P according to Variation 12. The antenna device 120P is different from the above antenna device 120M according to Variation 10 illustrated in FIG. 30 in that the dielectric in the non-adjustment region other than the designated region includes a projection 135P, and in that the connector C1 is provided to the projection 135P, not to the designated portion 131. The projection 135P projects toward the negative side in the Y-axis direction (an in-plane direction of the dielectric) with respect to the designated portions 131, i.e., the dielectric in the designated regions. Thus, the connector C1 may be provided to the projection 135P included in the dielectric in the region that is other than the designated region.

The features of the above embodiment and Variations 1 to 12 may be combined in any way as long as no contradiction occurs.

It should be understood that the embodiment disclosed herein is only exemplary and are not restrictive in all respects. The scope of the present disclosure is defined by the claims, not by the above description of the embodiment, and is intended to include all changes made within the context and scope equivalent to the claims.

REFERENCE SIGNS LIST

10 communication apparatus
100 antenna module
111A to 111D, 113A to 113D, 117 switch
112AR to 112DR low-noise amplifier
112AT to 112DT power amplifier
114A to 114D attenuator
115A to 115D phase shifter
116 multiplexer/demultiplexer
118 mixer
119 amplifier circuit

120, 120A to 120M, 120P antenna device
121, 121*a*, 121*b* radiating element
130, 130C, 130E to 130L dielectric substrate
130*a* first major surface
130*b* second major surface
131 designated portion
131E, 131F curved portion
131*a*, 135P projection
131*b*, 131*c* dielectric
135 base portion
135E, 135F first base portion
136E, 136F second base portion
A, A1 to A4 adjustment region
B non-adjustment region
C connector
GND grounding electrode
L1 first boundary plane
L2 second boundary plane
SP feeding point

The invention claimed is:

1. An antenna device comprising:
a plate-shaped first radiating element that, in response to being exited with a transmission signal, radiates a radio wave polarized in a first direction; and
a dielectric substrate that carries the first radiating element, wherein
when defining planes extending on end faces of the first radiating element on respective sides in the first direction and being orthogonal to the first direction as first boundary planes, and defining planes extending on end faces of the first radiating element on respective sides in a second direction, which is orthogonal to the first direction, and being orthogonal to the second direction as second boundary planes,
each of the first boundary planes defines an inner portion of the dielectric substrate and an outer portion of the dielectric substrate with respect to itself,
each of the second boundary planes defines an inner portion of the dielectric substrate and an outer portion of the dielectric substrate with respect to itself, and
the dielectric substrate includes
adjustment regions around the first radiating element where the outer portions of the first boundary planes intersect the outer portions of the second boundary planes, and
the adjustment regions include a designated region that is exclusive to the adjustment regions where an effective dielectric constant is different from an effective dielectric constant in a non-adjustment region that is a region other than the adjustment regions.

2. The antenna device according to claim 1, wherein the effective dielectric constant in the designated region is smaller than the effective dielectric constant in the non-adjustment region.

3. The antenna device according to claim 2, wherein an amount of dielectric material in the designated region is thinner than that in the non-adjustment region.

4. The antenna device according to claim 2, wherein an amount of dielectric material in the designated region is thicker than that in the non-adjustment region.

5. The antenna device according to claim 1, further comprising:
a second radiating element carried by the dielectric substrate and being spaced at a predetermined interval from the first radiating element,
wherein the designated region is located at an overlap between one of the adjustment regions of the first radiating element and a corresponding one of adjustment regions of the second radiating element.

6. The antenna device according to claim 2, further comprising:
a second radiating element carried by the dielectric substrate and being spaced at a predetermined interval from the first radiating element,
wherein the designated region is located at an overlap between one of the adjustment regions of the first radiating element and a corresponding one of adjustment regions of the second radiating element.

7. The antenna device according to claim 3, further comprising:
a second radiating element carried by the dielectric substrate and being spaced at a predetermined interval from the first radiating element,
wherein the designated region is located at an overlap between one of the adjustment regions of the first radiating element and a corresponding one of adjustment regions of the second radiating element.

8. The antenna device according to claim 4, further comprising:
a second radiating element carried by the dielectric substrate and being spaced at a predetermined interval from the first radiating element,
wherein the designated region is located at an overlap between one of the adjustment regions of the first radiating element and a corresponding one of adjustment regions of the second radiating element.

9. The antenna device according to claim 5, wherein dielectric material in the designated region includes a projection that projects with respect to other dielectric material in the non-adjustment region in an in-plane direction of the dielectric substrate.

10. The antenna device according to claim 9, further comprising a component provided to the projection of the dielectric material in the designated region.

11. The antenna device according to claim 9, wherein the projection of the dielectric material in the designated region is curved and is connected to another dielectric substrate.

12. The antenna device according to claim 11, wherein the other dielectric substrate carries a third radiating element.

13. The antenna device according to claim 5, wherein a dielectric material in a region other than the designated region has a projection that projects with respect to another dielectric material in the designated region in an in-plane direction of the dielectric substrate.

14. The antenna device according to claim 13, further comprising a component provided to the projection of the dielectric material in the region other than the designated region.

15. The antenna device according to claim 13, wherein the projection of the dielectric material in the region other than the designated region is curved and is connected to another dielectric substrate.

16. The antenna device according to claim 15, wherein the other dielectric substrate carries a third radiating element.

17. An antenna device comprising:
a plate-shaped first radiating element that, in response to being exited with a transmission signal, radiates a radio wave polarized in a first direction; and
a dielectric substrate that carries the first radiating element, wherein
when defining planes extending on end faces of the first radiating element on respective sides in the first direction and being orthogonal to the first direction as first boundary planes, and defining planes extending on end faces of the first radiating element on respective sides in a second direction, which is orthogonal to the first direction, and being orthogonal to the second direction as second boundary planes, each of the first boundary planes defines an inner portion of the dielectric substrate and an outer portion of the dielectric substrate with respect to itself, each of the second boundary planes defines an inner portion of the dielectric substrate and an outer portion of the dielectric substrate with respect to itself, and the dielectric substrate includes adjustment regions around the first radiating element where the outer portions of the first boundary planes intersect the outer portions of the second boundary planes, and the adjustment regions include a designated region that is exclusive to the adjustment regions and that is thinner than a dielectric material in a non-adjustment region that is a region other than the adjustment regions.

18. The antenna device according to claim 17, further comprising:

a second radiating element carried by the dielectric substrate and being spaced at a predetermined interval from the first radiating element.

19. An antenna device comprising:

a plate-shaped radiating element; and a dielectric substrate that carries the plate-shaped radiating element, wherein the plate-shaped radiating element has a feeding point at a position that is offset from a center of a plane of the plate-shaped radiating element, when defining a direction of a virtual line connecting the center of the plane of the plate-shaped radiating element and the feeding point as a first direction, defining planes extending on end faces of the plate-shaped radiating element on respective sides in the first direction and being orthogonal to the first direction as first boundary planes, and defining planes extending on end faces of the plate-shaped radiating element on respective sides in a second direction, which is orthogonal to the first direction, and being orthogonal to the second direction as second boundary planes, each of the first boundary planes defines an inner portion of the dielectric substrate and an outer portion of the dielectric substrate with respect to itself, each of the second boundary planes defines an inner portion of the dielectric substrate and an outer portion of the dielectric substrate with respect to itself, and the dielectric substrate includes adjustment regions around the plate-shaped radiating element where the outer [sides] portions of the first boundary planes intersect the outer portions of the second boundary planes, and the adjustment regions include a designated region that is exclusive to the adjustment regions where an effective dielectric constant is different from an effective dielectric constant in a non-adjustment region that is a region other than the adjustment regions.

20. The antenna device according to claim 19, further comprising:

another radiating element carried by the dielectric substrate and being spaced at a predetermined interval from the plate-shaped radiating element.

* * * * *